United States Patent
Peedikakkal et al.

(10) Patent No.: US 12,415,817 B1
(45) Date of Patent: Sep. 16, 2025

(54) MIXED-METAL METAL ORGANIC FRAMEWORK

(71) Applicant: KING FAHD UNIVERSITY OF PETROLEUM AND MINERALS, Dhahran (SA)

(72) Inventors: Abdul Malik P. Peedikakkal, Dhahran (SA); Isam Hasan Aljundi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/207,485

(22) Filed: May 14, 2025

Related U.S. Application Data

(60) Continuation of application No. 17/873,746, filed on Jul. 26, 2022, now Pat. No. 12,319,704, which is a division of application No. 16/805,143, filed on Feb. 28, 2020, now Pat. No. 11,420,983.

(51) Int. Cl.

| | |
|---|---|
| *C07F 1/08* | (2006.01) |
| *C01B 3/00* | (2006.01) |
| *C07F 3/06* | (2006.01) |
| *C07F 15/02* | (2006.01) |
| *C07F 15/04* | (2006.01) |
| *C07F 15/06* | (2006.01) |

(52) U.S. Cl.
CPC ............ *C07F 1/08* (2013.01); *C01B 3/0015* (2013.01); *C07F 3/06* (2013.01); *C07F 15/02* (2013.01); *C07F 15/04* (2013.01); *C07F 15/06* (2013.01)

(58) Field of Classification Search
CPC ... B01J 20/226; C07F 1/08; C07F 3/06; C07F 15/02; C07F 15/04; C07F 15/06; C01B 3/0015
See application file for complete search history.

(56) References Cited

U.S. PATENT DOCUMENTS

| | | | |
|---|---|---|---|
| 9,975,114 B2 | 5/2018 | Jimoh et al. | |
| 10,675,608 B2 | 6/2020 | Eddaoudi | |
| 11,253,838 B2 | 2/2022 | Weston | |
| 11,420,983 B2 * | 8/2022 | Peedikakkal | C07F 15/065 |
| 12,319,704 B2 * | 6/2025 | Peedikakkal | C07F 15/065 |
| 2015/0360201 A1 | 12/2015 | Chen | |
| 2017/0326536 A1 | 11/2017 | Jimoh | |

FOREIGN PATENT DOCUMENTS

| | | |
|---|---|---|
| CN | 105312028 A | 2/2016 |
| CN | 105833852 B | 10/2018 |
| MX | 2013014913 A | 6/2015 |
| WO | WO 2017/223046 A1 | 12/2017 |

OTHER PUBLICATIONS

S. Dong et al., 858 Journal of Electroanalytical Chemistry, 1-10 (2020) (Year: 2020).*
J. Hu et al., RSC Advances, 35124-35120 (2014) (Year: 2014).*
Jing Tang, et al., "Host-Guest Interaction between Methanol and Metal-Organic Framework $Cu_{3-x}Zn_x(btc)_2$ as Revealed by Solid-State NMR", the Journal of Physical Chemistry C, vol. 123, No. 39, Sep. 16, 2019, pp. 24062-24070 (Abstract only).
Zeynel Ozturk, et al., "Experimental and Simulation Study on Structural Characterization and Hydrogen Storage of Metal Organic Structured Compounds", International Conference On Hydrogen Production, ICH2P-2015 Special Issue in the International Journal of Hydrogen Energy (IJHE), Nov. 2015, pp. 1-19.
Sara ABDENATANZI, et al., "Mixed-metal Metal-Organic Frameworks", Chemical Society Reviews, Royal Society of Chemistry, vol. 48, No. 9, 2019, pp. 2535-2565.
Ekaterina A. Dolgopolova, et al., "Electronic Properties of Bimetallic Metal-Organic Frameworks (MOFs): Tailoring the Density of Electronic States through MOF Modularity", Journal of the American Chemical Society (JACS), vol. 139, No. 14, Mar. 18, 2017, pp. 5201-5209 (Abstract only).
M. Chumillas et al., 451 Coordination Chemistry Reviews (2022) (Year: 2022).
S Chui et al., 283 Science, 1148-1150 (2012) (Year: 2012).
N. Niluroutu et al., 42 New. J. Chem., 16758-16765 (2018) (Year: 2018).
M. Li et al., 114 Chemical Reviews, 1343-1370 (2013) (Year: 2013).
M. Kim et al., 134 Journal of the American Chemical Society, 18082-18088 (2012) (Year: 2012).

(Continued)

*Primary Examiner* — Alexander R Pagano
(74) *Attorney, Agent, or Firm* — Oblon, McClelland, Maier &Neustadt, L.L.P.

(57) ABSTRACT

Mixed metal metal-organic frameworks (MM-MOFs) of copper-1,3,5-benzenetricarboxylate (BTC), M-Cu-BTC, wherein M is Zn(II), Ni(II), Co(II), and/or Fe(II) may be made using post-synthetic exchange (PSE) with metal ions. Such MM-MOFs may be used in $H_2$ storage, especially Ni(II) and Co(II) MM-MOFs. Selected metal exchanged materials can provide gravimetric $H_2$ uptake around 1.63 wt. % for Zn—Cu-BTC, around 1.61 wt. % for Ni—Cu-BTC, around 1.63 wt. % for Fe—Cu-BTC, and around 1.12 wt. % for Co—Cu-BTC.

6 Claims, 10 Drawing Sheets

(56) References Cited

OTHER PUBLICATIONS

S. Das et al., 131 Journal of the American Chemical Society, 3814-3815 (2009) (Year: 2009).
S. Abednatanzi et al., 48 Chem. Soc. Rev., 2535-2565 (2019) (Year: 2019).
A. Peedikakkal et al., 11 Applied Science (2021) (Year: 2021).
A. Peedikakkal et al., 5 ACS Omega, 28493-28499 (2020) (Year: 2020).
A. Peedikakkal et al., 42 Arab J Sci Eng (2017) (Year: 2017).
H. Yang et al., 143 Microporous and Mesoporous Materials, 37-45 (2011) (Year: 2011).
Z. Wang et al., 38 Chem. Soc. Rev., 1315-1329 (2009) (Year: 2009).
J. Tang et al., 123 The Journal of Physical Chemistry C, 24062-24070 (2019) (Year: 2019).
X. Song et al., 14 CrystEngComm, 5753-5756 (2012) (Year: 2012).
J. Li et al., 34 International Journal of Hydrogen Energy, 1377-1382 (2009) (Year: 2009).
S. Amirjalayer et al., 115 The Journal of Physical Chemistry C, 15133-15139 (2011) (Year: 2011).
J. Chakraborty et al., 326 Coordination Chemistry Reviews, 135-163 (2016) (Year: 2016).

\* cited by examiner

MIXED-METAL METAL ORGANIC FRAMEWORK

CROSS-REFERENCE TO RELATED APPLICATIONS

The present application is a Continuation of U.S. application Ser. No. 17/873,746, now allowed, having a filing date of Jul. 26, 2022 which is a Division of U.S. application Ser. No. 16/805,143, now U.S. Pat. No. 11,420,983, having a filing date of Feb. 28, 2020.

STATEMENT OF ACKNOWLEDGEMENT

The inventors gratefully acknowledge the support provided by King Abdulaziz City for Science and Technology (KACST) for funding this work through National Science, Technology and Innovation Plan (NSTIP) project number 14-ENE2278-04.

BACKGROUND OF THE INVENTION

Field of the Invention

The present disclosure relates to metal-organic frameworks (MOFs), particularly mixed metal metal-organic frameworks (MM-MOFs), preferably including analogs of copper-1,3,5-benzenetricarboxylate (Cu-BTC), M-Cu-BTC, wherein M comprises Zn(II), Ni(II), Co(II), and/or Fe(II), which MM-MOFs may be made by processes including post-synthetic exchange (PSE) with desired metal ions, as well as to methods of making and using such MM-MOFs.

Description of the Related Art

Having a high energy density and the potential to provide zero-$CO_2$ emission storable energy, hydrogen ($H_2$) represents a potential alternative energy source, and its storage and delivery are important components in the development of fuel-cell hydrogen technologies. Several materials have been tested for $H_2$ storage, including physisorption and chemisorption materials. However, to date no solid-state storage system has satisfied the U.S. Department of Energy (DOE) 2020 capacity targets of 4.5 wt. % (in gravimetric terms) and 30 g/L of $H_2$ (in volumetric terms) at operating temperature ranges of −40 to 60° C. and at pressures below 100 atm.

In physisorption materials, $H_2$ molecules are adsorbed on the surface of the pores in the material, there is no activation energy involved, and the interaction between $H_2$ and the material is low. In addition, physisorption materials' fast kinetics, full reversibility, and manageable heat during refueling—characteristics that are difficult to achieve when using chemisorption materials—can make the use of physisorption materials especially advantageous over chemisorption materials.

In this respect, metal-organic frameworks (also referred to as MOFs), which are physisorption materials, are promising materials for $H_2$ storage. Metal-organic frameworks (MOFs) can contain micropores and channels with a specific topological framework and adjustable/modifiable surface areas and pore sizes. MOFs can be synthesized using solvothermal reactions, which combine the constituent metal and organic ligands using organic solvents such as dimethylformamide (DMF) and diethylformamide (DEF), and can be designed from various combinations of metal ions and organic ligands.

The topological framework and pore size of the metal-organic frameworks (MOFs) depend on the metal ions and organic ligands used in the MOF in question. MOFs can have high surface areas and permanent porosity, both of which are attractive for use in $H_2$ storage systems. The pore size and framework topology of MOFs have been successfully tuned in some cases to obtain high surface-area materials that effectively improve the $H_2$ adsorption properties. Although a wide range of MOFs have been tested for $H_2$ adsorption, and some have shown promising storage capacities in the cryogenic state, the capacities of these MOFs have been insignificant at ambient pressure and temperature. These exceptional characteristics and behaviors of MOFs with unique frameworks give unlimited prospects to precisely tailor required dynamic sites and create MOF candidates for hydrogen ($H_2$) storage applications.

Cation exchange is attractive strategy to modify the active sites of secondary building units (SBUs) in metal-organic frameworks (MOFs). By design, secondary building units (SBUs) in MOFs, also known as polynuclear cluster nodes, are capable of imparting (1) thermodynamic stability via strong covalent bonds and (2) mechanical/architectural stability by strong directional bonds that can lock down the position of metal centers in metal-organic frameworks. The strategy of cation exchange in secondary building units (SBUs) of MOFs can enhance the properties of MOFs materials for various desired end applications.

Although, single-metal metal-organic frameworks (MOFs) materials were well studied for hydrogen adsorption, mixed metal MOFs (MM-MOFs) have rarely been investigated. The expansion of MM-MOFs materials is of interest since the assimilation of more metal ions has the potential to increase the interaction of hydrogen ($H_2$) molecule with the metal sites and the selectivity of MOF adsorption.

A practical technique for the production of mixed metal MOFs (MM-MOFs) is post-synthetic exchange (PSE) for metal ions or transmetallation that involves the replacement of the secondary building unit (SBU) metal nodes with another metal ion. The copper-based MOF, Cu-BTC, i.e. copper-1,3,5-benzenetricarbonate, also known as Cu-H3BTC, Cu-TMA (trimesic acid), HKUST-1 (Hong Kong University of Science & Technology), MOF-199, is possibly the most investigated MOF material, whereby in Cu-BTC, typically two Cu(II) metal units are linked by three benzene-1,3,5-tricarboxylate (BTC) linkers. Cu-BTC is also commercially available as the BASOLITE® C 300 MOF from the Badischen Analin-und Soda-Fabrik (BASF, Ludwigshafen, Germany).

The coordinated water molecules in axial positions of the paddlewheel Cu(II) centers of the Cu-BTC structure can be removed by thermal treatment. Such a thermal treatment to remove the coordinated water can generate potential active sites for hydrogen ($H_2$) adsorption. Although hydrogen ($H_2$) adsorption in Cu-BTC has been investigated, the hydrogen ($H_2$) adsorption kinetics of this material in mixed metal metal-organic frameworks (MM-MOFs) have not been reported to date.

It is known that an analogous, isostructural Zn-BTC metal-organic framework (MOF) can be made from a zinc source and the BTC ligand. It is also known that mixed metal metal-organic frameworks (MM-MOFs) of Zn-BTC can be made using many different divalent transition metal ions, such as $Cu^{2+}$, $Co^{2+}$, or $Fe^{2+}$, e.g., for catalysis. Cu—Zn-BTC and Cu—Ru-BTC mixed metal metal-organic frameworks (MM-MOFs) have also been reported.

Cu-BTC has been particularly well recognized for its high selectivity in gas storage especially when the axial aqua ligands are removed via activation. Activation provides unsaturated metal sites without affecting the rigid framework of the metal-organic framework (MOF). The highest Brunauer-Emmett-Teller (BET) surface area reported for Cu-BTC was about 1944 m$^2$/g by *J. Am. Chem. Soc.* 2006, 128, 3494-3495. The highest gravimetric molecular hydrogen ($H_2$) uptake reported for Cu-BTK is approx. 2 wt. % at 77 K and low pressure and approx. 3 to 3.5 wt. % at 77K and higher pressure.

Studies in the art allow the hypothesis that the Cu-BTC mixed metal metal-organic framework (MM-MOF) is a reasonable systemic basis upon which to expand the concept of metal exchange for hydrogen storage. Certain research in the field warrants mention.

U.S. Pat. No. 9,975,114 to Jimoh et al. (Jimoh) discloses a metal organic framework (MOF) comprising $Zn^{2+}$ and second metal ions, such as $Fe^{2+}$, $Co^{2+}$, and $Cu^{2+}$ as nodes or clusters and coordinated 1,3,5-benzenetricarboxylic acid (BTC) linkers between them forming a porous coordination network as polyhedral crystals that are isostructural to HKUST-1. Jimoh describes transmetallation processes for producing the MOFs and using the MOFs as oxidation catalysts for cyclic hydrocarbons. Jimoh discloses that additional metals to Zn may include Ag, Ca, K, Zn, Na, Pb, Mn, Fe, Co, Ni, Al, Cu, Sn, Cd, Hg, Cr, Fe, Bi, Ga, Ge, Au, In, Tl, Rb, Cs, As, Sb, Cr, Zn, V, Pt, Pd, and/or Rh, particularly Fe, Co, and Cu. Jimoh's MOFs may have ratios of $Zn^{2+}$ to the additional metal ions in the range of 0.01 to 5.0, particularly a ratio of $Zn^{2+}$ to $Cu^{2+}$ may be in the range of 0.01 to 1.0. Jimoh describes Co—Zn-BTC or Fe— Zn-BTC with 10 to 55 atom. %, most preferably 32 to 36 atom. % $Co^{2+}$ or $Fe^{2+}$ (replacing $Zn^{2+}$), or Cu—Zn-BTC with 65 to 95 atom. %, most preferably 85 to 90 atom. % $Cu^{2+}$ (replacing $Zn^{2+}$). Jimoh does not describe $H_2$ storage and/or adsorption, nor mixed metal Cu-BTC with selected exchange rates in ranges around 7.5 to 30 atom. %, particularly based on post-synthesis diffusive exchange of second metal ions into a Cu-BTC structure.

WO 2017/223046 A1 by Zhao et al. (Zhao) discloses methods of making metal-organic frameworks (MOFs) including contacting a metal oxide with a metal salt to form a hydroxy double salt, and contacting the hydroxy double salt with an organic linker to form the metal-organic framework. Zhao discloses an MOF comprising copper and 2-aminoterephthalate, and describes its MOFs as useful in respiration and filter applications, for example for removal of toxic gases and/or vapors. Zhao uses benzene tricarboxylate (BTC), benzene dicarboxylate (BDC), aminobenzene dicarboxylate (BDC-$NH_2$), aminoterephthalate (ATA), or biphenyldicarboxylate (BPDC) as linkers. Zhao describes adsorption of $N_2$, $NH_3$, $H_2S$, $Cl_2$, $NO_2$, HCN, HCl, $(CN)_2$, Cl—CN, $SO_2$, and/or volatile organic compounds, or chemical warfare agents, for example, using Cu(ATA). Zhao's materials are generally synthesized by reacting one divalent metal oxide with another different divalent cation, $M^{2+}$. Zhao synthesizes an MOF from a 1:2 solution of ZnO and $Cu(NO_3)_2$ with 1,3,5-benzenetricarboxylic acid (BTC), but Zhao reports mainly unincorporated ZnO and no more than 0.67 wt. % $Zn^{2+}$ in the Cu-BTC. Zhao does not describe diffusion-based metal exchange for a Cu-BTC MOF or the storage of hydrogen ($H_2$) gas.

CN 105312028 A by Cheng et al. (Cheng) discloses a zinc and copper bi-metal organic framework material (MOF) and its preparation and application. Cheng's method involves adding a soluble copper salt, zinc salt, and trimesic acid to a mixed solvent of N,N'-dimethyl formamide (DMF), water, and ethanol, and stirring and ultrasonicating, to obtain a reaction liquid; transferring the reaction liquid into a PTFE reaction vessel for a hydrothermal reaction, to obtain a crude Zn and Cu MOF material; washing the crude material with DMF then soaking in ethanol, and activating to obtain a purified Zn—Cu-MOF. Cheng describes using its Zn—Cu-MOF for adsorbing Congo red molecules in water. Cheng does not employ a post-synthesis exchange for transmetalating the MOF, nor does Cheng describe the amounts of metals incorporated in the MOF. Moreover, Cheng is silent on hydrogen ($H_2$) adsorption.

CN 105833852 B by Zhou et al. (Zhou) discloses an MOF composite adsorption material, IMI@Cu-BTC, and its preparation. Zhou's method involves: dissolving ZnO in deionized water and DMF, to obtain a ZnO solution; dissolving $Cu(NO_3)_2 \cdot 3H_2O$ in deionized water, to obtain a $Cu(NO_3)_2$ solution; dissolving trimesic acid (BTC) and imidazole (IMI) in ethanol, to obtain an organic ligand solution; adding the $Cu(NO_3)_2$ solution into the ZnO solution, then adding the organic ligand solution, stirring and reacting for 5 to 10 minutes, separating, washing, drying, and vacuum activating to obtain the IMI@Cu-BTC. Zhou reports that imidazole (IMI) introduction into the MOF material reduces the adsorption interaction to water vapor, enhances the structural stability in humid environments, and maintains an adsorption capacity for $CO_2$. Zhou, like Zhao, does not appear to incorporate Zn into its Cu-BTC material, and Zhou fails to describe $H_2$ adsorption or storage.

MX 2013014913 A by Beltran et al. (Beltran) discloses a method for synthesizing metal-organic networks (MOFs) based on a single-step metathesis reaction between a multimodal binder with a hydrated copper salt prepared in situ, obtaining a three-dimensional material of the metal-organic network type, for example, $[Cu_3(BTC)_2]_n$, i.e., "HKUST-1." Beltran's metathesis reaction provides solvates of $[Cu_3(BTC)_2]_n$, but Beltran does not mention mixed-metal forms of Cu-BTC, nor $H_2$ adsorption or storage.

*J. Phys. Chem. C* 2016, 126(39), 24062-24070 by Tang et al. (Tang) describes the metal-organic framework (MOF), $Cu_{3-x}Zn_x(BTC)_2$, and its use in electrocatalysis, proton conduction, and chemical sensors. Tang reports that methanol could be coordinated with open metal sites on $Zn^{2+}$ and $Cu^{2+}$ separately in $Cu_{3-x}Zn_x(BTC)_2$. Tang describes that the distribution of $Zn^{2+}$ and $Cu^{2+}$ in $Cu_{2.1}Zn_{0.9}(BTC)_2$ is likely in a domain metal arrangement, and that the $Zn^{2+}$ instead of $Cu^{2+}$ site in $Cu_{2.1}Zn_{0.9}(BTC)_2$ is the primary methanol adsorption site. Tang's MM-MOF contains 30 atom. % Zn and 70 atom. % Cu in the Zn—Cu-BTC structure, relative to metal content. Tang does not disclose a diffusion-based gradient distribution of Zn in a Cu-BTC MOF, nor does Tang discuss $H_2$ adsorption or storage.

The article entitled "Experimental and Simulation Study on Structural Characterization and Hydrogen Storage of Metal Organic Structured Compounds" (ICH2P-2015) in *Int. J. Hydrogen Energy* 2015, 41(19), 8256-8263 by Ozturk et al. (Ozturk) discloses reversibly storing hydrogen with metal-organic frameworks (MOFs) synthesized using Cu(II) and Zn(II) metals, benzene-1,3,5-tricarboxylic acid (BTC), and 1,10-phenantroline (Phen) building blocks. The hydrogen storage properties were measured at 77 K and 1 bar of $H_2$ pressure. Ozturk reports that the Cu(II) compound could take up 2.652 wt. % $H_2$ at 77 K and 1 bar $H_2$ pressure, and the Zn(II) compound could take up 1.383 wt. % $H_2$ at 77 K and 1 bar $H_2$ pressure. Ozturk's compounds contain either copper or zinc ions, but not both.

*Chem. Soc. Rev.* 2019, 48(9), 2535-2565 by Abednatanzi et al. (Abednatanzi) describes mixed-metal metal-organic frameworks (MM-MOFs), i.e., containing at least two different metal ions as nodes of their frameworks. Abednatanzi describes post-synthetic ion-exchange, i.e., soaking a monometallic MOF in a concentrated solution of a different, but compatible, metal-ion. Abednatanzi describes gas sorption and storage and improving the stability and affinity towards the target gases by introducing a second metal ion. Abednatanzi describes replacing $Zn^{2+}$ ions with up to 56% $Cu^{2+}$ ions by immersing Zn-BCT in a methanol solution of $Cu(NO_3)_2 \cdot 2.5H_2O$ at ambient temperature, forms of Cu—Co-BTC at substitution rates of 0 and 50 atom. %, a $(Cu_{2.75}Ru_{0.25})_3$-$BTC_2$ MOF having a mixed Cu—Ru paddlewheel metal-inorganic units, and that an attempt to make $(Fe,Cu)_3$—$BTC_2$ did not lead to a MM-MOF, but to separate $Cu_3$-$BTC_2$ and $Fe_3$—$BTC_2$ phases. Abednatanzi does not disclose gradient-structured, post-synthesis exchanged Cu-BTC structures of the Ni, Fe, Co, or Zn, particularly in ranges of 10 to 30 atom. %.

*J. Am. Chem. Soc.* 2017, 139(14), 5201-5209 by Dolgopolova et. al. (Dolgopolova), which is reviewed in Abednatanzi, discloses three distinct classes of bimetallic systems, $M_{x-y}M'_y$-MOFs, $M_xM'_y$-MOFs, and $M_x(ligand-M'_y)$-MOFs, in which the second metal (M') incorporation occurs through (i) metal (M) replacement in the framework nodes, (ii) metal node extension, or (iii) metal coordination to the organic ligand. Dolgopolova describes modifying the electronic properties of MOFs from insulating to semiconducting, and $Cu_{2.25}Zn_{0.75}(BTC)_2$, i.e., 25 atom. % Zn, $Cu_{1.95}Zn_{1.05}(BTC)_2$, i.e., 35 atom. % Zn, $Cu_{2.82}Co_{0.18}(BTC)_2$, i.e., 6 atom. % Co, $Cu_{2.4}Co_{0.6}(BTC)_2$, i.e., 20 atom. % Co, and $Cu_{1.5}Co_{0.5}(BTC)_2$, i.e., 50 atom. % Co. Dolgopolova does not describe $H_2$ adsorption or storage with its MM-MOFs. Dolgopolova does not disclose gradient-structured, post-synthesis exchanged Cu-BTC structures with Ni or Fe in any range, nor 12.5 to 25 atom. % Co exchange, nor 10 to 20 atom. % Zn exchange.

In light of the above, a need remains for modified mixed metal metal-organic frameworks (MM-MOFs) based on copper-1,3,5-benzenetricarboxylate (Cu-BTC), particularly for hydrogen ($H_2$) adsorption and/or storage, such as post-synthesis exchanged Cu-BTC with Ni, Zn, Co, and/or Fe, and methods of making and using such MM-MOFs.

SUMMARY OF THE INVENTION

Aspects of the invention provide mixed-metal metal organic frameworks (MM-MOFs), comprising: a linker comprising, relative to a total linker weight, at least 75 wt. % of 1,3,5-benzenetricarboxylate bound into the MM-MOF; and divalent metal cations comprising, relative to a total metal weight, at least 65 atom. % $Cu^{2+}$ and from 10 to 30 atom. % of $Ni^{2+}$, $Zn^{2+}$, $Co^{2+}$, and/or $Fe^{2+}$, bound into the MM-MOF, wherein the MM-MOF has a gradient in $Cu^{2+}$ concentration between a center of the MM-MOF and an outer perimeter of the MM-MOF, and wherein concentration of the $Cu^{2+}$ is higher towards the center of the MM-MOF than the outer perimeter. Such MM-MOFs may be modified by any permutation of the features described herein, particularly the following.

Inventive MM-MOFs may be crystalline by powder x-ray diffraction and/or have a TBO topology.

Inventive MM-MOFs may comprise the $Ni^{2+}$ in a range of from 10 to 30 atom. %, optionally with a remainder of the $Cu^{2+}$. Inventive MM-MOFs may comprise the $Zn^{2+}$ in a range of from 10 to 20 atom. %, optionally with a remainder of the $Cu^{2+}$. Inventive MM-MOFs may comprise the $Co^{2+}$ in a range of from 12.5 to 25 atom. %, optionally with a remainder of the $Cu^{2+}$. Inventive MM-MOFs may comprise the $Fe^{2+}$ in a range of from 12 to 22.5 atom. %, optionally with a remainder of the $Cu^{2+}$. The $Cu^{2+}$ gradient may be produced by a process comprising solution-based diffusion of the $Ni^{2+}$, $Zn^{2+}$, $Co^{2+}$, and/or $Fe^{2+}$, into a preexisting MOF comprising the $Cu^{2+}$ and the 1,3,5-benzenetricarboxylate.

The linker and the divalent metal cations may be ionically bound into the MM-MOF.

Inventive MM-MOFs may have a BET surface area of 820 to 945 $m^2/g$, a pore volume of 0.300 to 0.400 $cm^3/g$, and/or a mean pore diameter of 1.50 to 1.70 nm.

Inventive MM-MOFs may have a hydrogen gravimetric capacity of 2.25 to 6.5 wt. %.

Inventive MM-MOFs may be formed as polyhedral crystals having an average largest leg length in a range of from 1 to 5 μm.

Aspects of the invention provide $H_2$ gas storage containers, comprising any permutation of the inventive MM-MOF(s) described herein.

Aspects of the invention provide methods of storing $H_2$ gas, which methods may comprise contacting any permutation of the inventive MM-MOF(s) described herein with a fluid stream comprising $H_2$ gas.

Aspects of the invention provide methods of making one or more MM-MOF, e.g., any permutation of the inventive MM-MOF(s) described herein, which methods may comprise: soaking a single-metal MOF, comprising copper cations and 1,3,5-benzenetricarboxylate bound into the MOF, in a solution comprising a polar organic solvent and a salt of $Ni^{2+}$, $Zn^{2+}$, $Co^{2+}$, and/or $Fe^{2+}$ for 24 to 120 hours at a temperature of −50 to 150° C. to form the MM-MOF comprising the copper cations, the 1,3,5-benzenetricarboxylate, and $Ni^{2+}$, $Zn^{2+}$, $Co^{2+}$, and/or $Fe^{2+}$, wherein the MM-MOF and the single-metal MOF have a TBO topology, wherein the MM-MOF has a divalent metal cation to copper cation ratio in a range of from 1:10 to 1:4, and wherein the mixed-metal MOF has a BET surface area in a range of from 600 to 1100 $m^2/g$, a pore volume in a range of from 0.300 to 0.400 $cm^3/g$, a mean pore diameter in a range of from 1.50 to 1.70 nm, and/or a gravimetric capacity for $H_2$ of 1.02 to 2.00 wt. %.

Aspects of the invention provide MM-MOFs comprising: a linker comprising 1,3,5-benzenetricarboxylate; copper (II) cations; and nickel (II) cations, wherein a powder x-ray diffraction pattern of the MM-MOF has at least 95% identity with a powder x-ray diffraction pattern of a single-metal copper-1,3,5-benzenetricarboxylate MOF, and/or wherein MM-MOF is crystalline by PXRD and has TBO topology.

Inventive MM-MOFs may have a gradient in concentration between a center of the MM-MOF and an outer perimeter of the MM-MOF, wherein concentration of the $Cu^{2+}$ is higher towards the center of the MM-MOF than the outer perimeter.

Inventive MM-MOFs may comprise no more than 2.5 wt. % amorphous phases.

Inventive MM-MOFs may comprise the $Ni^{2+}$ in a range of from 10 to 30 atom. %, optionally with a remainder of the $Cu^{2+}$.

Inventive MM-MOFs may have a gradient in $Cu^{2+}$ concentration between a center of the MM-MOF and an outer perimeter of the MM-MOF, wherein concentration of the $Cu^{2+}$ is higher towards the center of the MM-MOF than the outer perimeter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
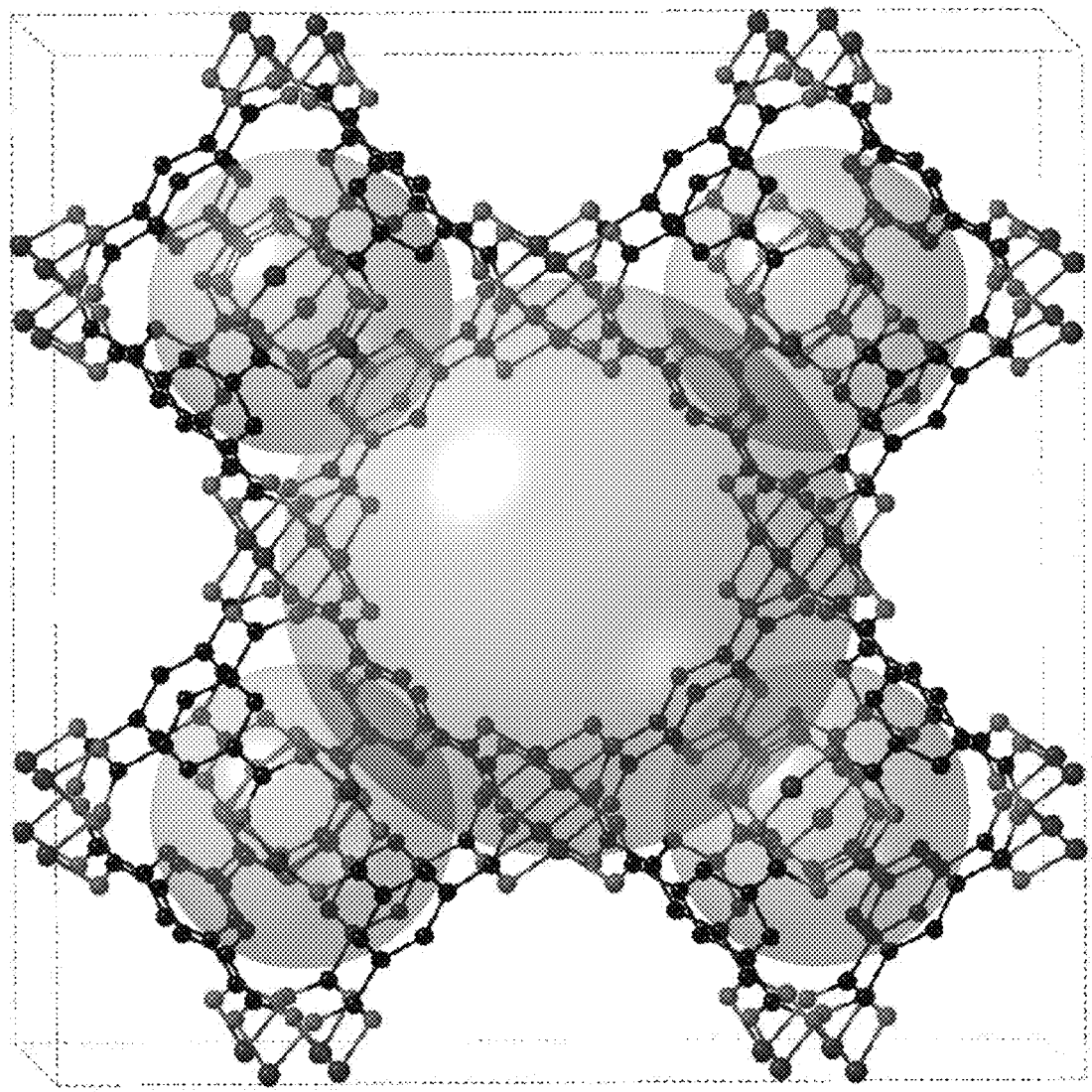
FIG. 1 shows a perspective view of a ball-and-stick model of a copper-1,3,5-benzenetricarboxylate (Cu-BTC) metal-organic framework (MOF) along a hypothetical z-axis, wherein the spheres represent the cavities in Cu-BTC.

Aspects of the invention provide certain mixed-metal metal organic frameworks (MM-MOFs), i.e., of a class of compounds comprising two or more different metal ions/clusters coordinated to organic ligands (or "struts") to form one-, two-, or three-dimensional structures, as a subclass of coordination polymers typically having porosity. MM-MOFs typically manifest a coordination network with organic ligands containing potential voids, including a coordination compound extending, through repeating coordination entities, in one dimension, but with cross-links between two or more individual chains, loops, or spiro-links, or a coordination compound extending through repeating coordination entities in two or three dimensions. Inventive MM-MOFs may comprise: a linker, i.e., a typically organic ligand, entirely comprising 1,3,5-benzenetricarboxylate or comprising, relative to a total linker weight, at least 75, 80, 85, 90, 91, 92, 92.5, 93, 94, 95, 96, 97, 97.5, 98, 99, 99.1, 99.5, or 99.9 wt. % of 1,3,5-benzenetricarboxylate bound into the MM-MOF. The binding of such ligands is typically based upon ionic interaction, e.g., ionic bonding. Inventive MM-MOFs comprise divalent metal cations comprising, relative to a total metal weight, at least 65, 67.5, 70, 72.5, 75, 77.5, 78, 79, 80, 81, 82, 82.5, 83, 84, 85, 86, 87, 87.5, 88, 89, 90, 91, 92, 92.5, 93, 94, or 95 atom. % $Cu^{2+}$ and/or up to 95, 92.5, 90, 89.5, 89, 88.5, 88, 87.5, 87, 86.5, 86, 85.5, 85, 84.5, 84, 83.5, 83, 82.5, 82, 81.5, 81, 80.5, or 80 atom. % $Cu^{2+}$, and from 10 to 30 atom. % of $Ni^{2+}$, $Zn^{2+}$, $Co^{2+}$, and/or $Fe^{2+}$, e.g., at least 10, 10.5, 11, 11.5, 12, 12.5, 13, 13.5, 14, 14.5, 15, 15.5, 16, 16.5, 17, 17.5, 18, 18.5, 19, 19.5, or 20 atom. % and/or up to 30, 27.5, 25, 24, 23, 22.5, 22, 21.5, 21, 20.5, 20, 19.5, 19, 18.5, 18, 17.5, 17, 16.5, 16, 15.5, 15, 14.5, 14, 13.5, 13, or 12.5 atom. % bound into the MM-MOF.

The MM-MOF may have a gradient in $Cu^{2+}$ concentration between a center of the MM-MOF and an outer perimeter of the MM-MOF, and wherein concentration of the $Cu^{2+}$ is higher towards the center of the MM-MOF than the outer perimeter. That is, the MM-MOF may be a product of an initially synthesized single metal MOF, like Cu-BTC (HKUST-1), which is subsequently treated with a solution of a second (or third, fourth, fifth, etc.) metal ion, such as $Ni^{2+}$, $Zn^{2+}$, $Co^{2+}$, and/or $Fe^{2+}$, to exchange some of the initial metal (e.g., $Cu^{2+}$) with the second or further metal(s). This approach may provide a product having a core with higher concentration of the initial metal (e.g., $Cu^{2+}$) than the outer perimeter of the product, based upon the diffusion of the second or further metal(s) from the perimeter into the core of the material, through the initial single-metal MOF matrix.

Useful materials for the second or further metal(s), such as $Ni^{2+}$, $Zn^{2+}$, $Co^{2+}$, and/or $Fe^{2+}$, may be salts of such metals including, e.g., nitrate, chloride, bromide, iodide, chlorate, perchlorate, bromate, perbromate, iodate, periodate, sulfate, bisulfate, carbonate, bicarbonate, phosphate, hydrogen phosphate, dihydrogen phosphate, tetrafluoroborate, hexafluorophosphate, tetrachloroaluminate, citrate, acetate, formate, cyanide, oxalate, tartrate, triflate, mesylate, tosylate, besylate, a BARF anion, etc., in some applications preferably using a non-coordinating anion.

Inventive MM-MOFs may be crystalline by powder x-ray diffraction, particularly under the conditions described in the examples, and/or have a TBO topology, often written tbo topology, is meant to include MOFs and MM-MOF with (3,4)-coordinated net topology, as described in *Chem. Rev.* 2014, 114, 1343-1370; *Z. Kristallogr.* 2013, 228(7), 323-329; *Chem. Comm.* 2014, 50(32), 4207-4210; *Cryst. Eng. Comm.* 2016, 18(42), 8164-8171; *J. Phys. Chem. C* 2011, 115(31), 15133-15139; *Dalton Trans.* 2019, 48, 1595-1598; and *Coord. Chem. Rev.* 2019, 391, Pages 44-68, each of which are incorporated by reference herein in its entirety.

Inventive MM-MOFs may comprise the $Ni^{2+}$ in a range of from 10 to 30 atom. %, e.g., 10, 11, 12, 13, 14, 15, 15.5, 16, 16.5, 17, 17.5, 18, 18.5, 19, 19.5, or 20 atom. % and/or up to 30, 29, 28, 27, 26, 25, 24.5, 24, 23.5, 23, 22.5, 22, 21.5, 21, 20.5, or 20 atom. %, optionally with a remainder of the $Cu^{2+}$. Expressed in another way, inventive Ni—Cu-BTC MM-MOFs may comprise $Ni^{2+}$ in an amount of 20±0.1, 0.25, 0.33, 0.5, 0.67, 0.75, 0.85, 1, 1.25, 1.33, 1.5, 1.67, 1.75, 2, 2.5, 3.33, 5, 6.67, or 7.5 atom. % (or any combination of the aforementioned endpoints). At least 75, 80, 85, 90, 91, 92, 92.5, 93, 94, 95, 96, 97, 97.5, 98, 99, 99.1, 99.5, 99.9, or 100 atom. % of the remainder of such MM-MOFs may comprise the $Cu^{2+}$.

Inventive MM-MOFs may comprise the $Zn^{2+}$ in a range of from 10 to 20 atom. %, e.g., 10, 10.5, 11, 11.5, 12, 12.5, 12.75, 13, 13.25, 13.5, 13.75, 14, 14.25, 14.5, 14.75, or 15 atom. % and/or up to 20, 19.5, 19, 18.5, 18, 17.5, 17.25, 17, 16.75, 16.5, 16.25, 16, 15.75, 15.5, 15.25, or 15 atom. %, optionally with a remainder of the $Cu^{2+}$. Expressed in another way, inventive Zn—Cu-BTC MM-MOFs may comprise $Zn^{2+}$ in an amount of 15±0.1, 0.25, 0.33, 0.5, 0.67, 0.75, 0.85, 1, 1.25, 1.33, 1.5, 1.67, 1.75, 2, 2.33, 2.5, 2.67, 3.33, 3.67, 4.33, 4.67, 5, 5.33, 5.67, 6.33, 6.67, 7.33, or 7.5 atom. % (or any combination of the aforementioned endpoints). At least 75, 80, 85, 90, 91, 92, 92.5, 93, 94, 95, 96, 97, 97.5, 98, 99, 99.1, 99.5, 99.9, or 100 atom. % of the remainder of such MM-MOFs may comprise the $Cu^{2+}$.

Inventive MM-MOFs may comprise the $Co^{2+}$ in a range of from 12.5 to 25 atom. %, e.g., 12.5, 12.75, 13, 13.25, 13.5, 13.75, 14, 14.25, 14.5, 14.75, 15, 15.25, 15.5, 15.75, 16, 16.25, 16.5, 16.75, 17, 17.25, or 17.5 atom. % and/or up to 25, 24, 23, 22.5, 22, 21, 20, 19.75, 19.5, 19.25, 19, 18.75, 18.5, 18.25, 18, 177.5, 17.5, 17.25, or 17 atom. %, optionally with a remainder of the $Cu^{2+}$. Expressed in another way, inventive Co—Cu-BTC MM-MOFs may comprise $Co^{2+}$ in an amount of 17±0.1, 0.25, 0.33, 0.5, 0.67, 0.75, 0.85, 1, 1.25, 1.33, 1.5, 1.67, 1.75, 2, 2.33, 2.5, 2.67, 3.33, 3.67, 4.33, 4.67, 5, 5.33, 5.67, 6.33, 6.67, 7.33, or 7.5 atom. % (or any combination of the aforementioned endpoints). At least 75, 80, 85, 90, 91, 92, 92.5, 93, 94, 95, 96, 97, 97.5, 98, 99, 99.1, 99.5, 99.9, or 100 atom. % of the remainder of such MM-MOFs may comprise the $Cu^{2+}$.

Inventive MM-MOFs may comprise the $Fe^{2+}$ in a range of from 12 to 22.5 atom. %, e.g., 12, 12.25, 12.5, 12.75, 13, 13.25, 13.5, 13.75, 14, 14.25, 14.5, 14.75, 15, 15.25, 15.5, 15.75, 16, 16.25, 16.5, 16.75, 17, 17.25, or 17.5 atom. % and/or up to 22.5, 22, 21, 20, 19.75, 19.5, 19.25, 19, 18.75, 18.5, 18.25, 18, 177.5, 17.5, 17.25, or 17 atom. %, optionally with a remainder of the $Cu^{2+}$. Expressed in another way, inventive Fe—Cu-BTC MM-MOFs may comprise $Fe^{2+}$ in an amount of 16±0.1, 0.25, 0.33, 0.5, 0.67, 0.75, 0.85, 1, 1.25, 1.33, 1.5, 1.67, 1.75, 2, 2.33, 2.5, 2.67, 3.33, 3.67, 4.33, 4.67, 5, 5.33, 5.67, 6.33, 6.67, 7.33, or 7.5 atom. % (or any combination of the aforementioned endpoints). At least 75, 80, 85, 90, 91, 92, 92.5, 93, 94, 95, 96, 97, 97.5, 98, 99, 99.1, 99.5, 99.9, or 100 atom. % of the remainder of such MM-MOFs may comprise the $Cu^{2+}$.

The $Cu^{2+}$ gradient may be produced by a process comprising solution-based diffusion of the $Ni^{2+}$, $Zn^{2+}$, $Co^{2+}$, and/or $Fe^{2+}$, into a preexisting MOF comprising the $Cu^{2+}$ and the 1,3,5-benzenetricarboxylate. The preexisting MOF may be Cu-BTC or an MOF comprising at least 75, 80, 85, 90, 91, 92, 92.5, 93, 94, 95, 96, 97, 97.5, 98, 99, 99.1, 99.5, 99.9, 99.99, or 99.999 atom. % of $Cu^{2+}$, relative to all metal ions in the preexisting MOF, and 75, 80, 85, 90, 91, 92, 92.5, 93, 94, 95, 96, 97, 97.5, 98, 99, 99.1, 99.5, 99.9, 99.99, or 99.999 wt. % of 1,3,5-benzenetricarboxylate relative to all ligands/struts in the preexisting MOF. The linker and the divalent metal cations will typically be ionically bound into the MM-MOF, though secondary bonding, such as hydrogen bonding, and even covalent and/or metal bonding may play a role in the structure formation.

Inventive MM-MOFs may respectively have a BET surface area of 600 to 1100 $m^2/g$, or 820 to 945 $m^2/g$, e.g., at least 600, 612.5, 625, 630, 637.5, 650, 6625, 675, 687.5, 700, 712.5, 717.5, 725, 737.5, 740, 745, 750, 755, 760, 762.5, 770, 775, 787.5, 800, 812.5, 825, 830, 837.5, 850, 862.5, 875, 887.5, 900, 912.5, 925, 937.5, 950, 962.5, 975, 987.5, 1000, 1012.5, 1025, 1033, 1037.5, 1050, 1062.5, 1075, 1087.5, or 1100 $m^2/g$ and/or up to 2000, 1950, 1900, 1850, 1800, 1750, 1700, 1650, 1600, 1550, 1500, 1450, 1400, 1350, 1300, 1250, 1225, 1200, 1175, 1150, 1125, 1100, 1075, 1050, 1025, 1000, 975, 950, 925, 900, 875, 850, 825, 800, 775, 750, 725, 700, 675, 650, or 625 $m^2/g$.

Separately or additionally, inventive MM-MOFs may respectively have a pore volume of 0.200 to 0.400 $cm^3/g$, or 0.300 to 0.400 $cm^3/g$, e.g., at least 0.2125, 0.225, 0.23, 0.233, 0.2375, 0.25, 0.255, 0.26, 0.2625, 0.275, 0.2875, 0.3, 0.3125, 0.325, 0.3375, 0.35, 0.3625, 0.375, 0.38, 0.3875, or 0.4 $cm^3/g$ and/or up to 0.4, 0.3875, 0.375, 0.3625, 0.35, 0.3375, 0.325, 0.3125, 0.3, 0.2875, 0.28, 0.275, 0.27, 0.2625, 0.25, 0.2375, or 0.225 $cm^3/g$. Separately or additionally, inventive MM-MOFs may respectively have a mean pore diameter of 1.55 to 1.80 nm, or 1.50 to 1.70 nm, e.g., at least 1.50, 1.51, 1.52, 1.53, 1.54, 1.55, 1.56, 1.57, 1.58, 1.59, 1.6, 1.605, 161, 161.5, 162, 162.5, 163, 163.5, 164, 164.5, 165, 165.5, 166, 166.5, 167, 167.5, 168, 168.5, 169, 169.5, 170, 170.5, 171, 171.5, 172, 172.5, 173, 173.5, 174, 174.5, or 175 nm and/or up to 1.80, 179.5, 179, 178.5, 178, 177.5, 177, 176.5, 176, 175.5, 175, 174.5, 174, 173.5, 173, 172.5, 172, 171.5, 171, 170.5, 170, 169.5, 169, 168.5, 168, 167.5, 167, 166.5, 166, 165.5, 165, 164.5, 164, 163.5, 163, 162.5, 162, 161.5, 161, 160.5, or 160 nm.

Inventive MM-MOFs may respectively have a hydrogen ($H_2$) gravimetric capacity, i.e., an ability to store $H_2$, of 2.25 to 6.5 wt. %, or 1.02 to 2.00 wt. %, e.g., at least 1.02, 1.025, 1.05, 1.075, 1.10, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.375, 2.4, 2.425, 2.45, 2.475, 2.5, 2.525, 2.5, 2.575, 2.6, 2.625, 2.65, 2.675, 2.7, 2.725, 2.75, 2.775, 2.8, 2.825, 2.85, 2.875, 2.9, 2.925, 2.95, 2.975, 3, 3.025, 3.05, 3.075, 3.1, 3.125, 3.15, 3.175, 3.2, 3.225, 3.25, 3.275, 3.3, 3.325, 3.35, 3.375, 3.4, 3.425, 3.45, 3.475, 3.5, 3.525, 3.55, 3.575, 3.6, 3.625, 3.65, 3.675, 3.7, 3.725, 3.75, 3.775, 3.8, 3.825, 3.85, 3.875, 3.9, 3.925, 3.95, 3.975, 4, 4.025, 4.05, 4.075, 4.1, 4.125, 4.15, 4.175, 4.2, 4.225, 4.25, 4.275, 4.3, 4.325, 4.35, 4.375, 4.4, 4.425, 4.45, 4.475, 4.5, 4.525, 4.55, 4.575, 4.575, 4.6, 4.625, 4.65, 4.675, 4.7, 4.725, 4.75, 4.775, 4.8, 4.825, 4.85, 4.875, 4.9, 4.925, 4.95, 4.975, 5, 5.025, 5.05, 5.075, 5.1, 5.125, 5.15, 5.175, 5.2, 5.225, 5.25, 5.275, 5.3, 5.325, 5.35, 5.375, or 5.4 wt. % and/or up to 6.5, 6, 5.5, 5, 4.75, 4.5, 4.25, 4.125, 4, 3.875, 3.75, 3.625, 3.5, 3.375, 3.35, 3.325, 3.3, 3.275, 3.25, 3.225, 3.2, 3.175, 3.15, 3.125, 3.1, 3.075, 3.05, 3.025, 3, 2.975, 2.95, 2.925, 2.9, 2.875, 2.85, 2.825, 2.8, 2.775, 2.75, 2.725, 2.7, 2.675, 2.65, 2.625, 2.6, 2.575, 2.55, 2.525, 2.5, 2.475, 2.45, 2.425, 2.4, 2.375, 2.35, 2.325, 2.3, 2.275, 2.25, 2.225, 2.1, 2.175, 2.15, 2.125, 2.1, 2.075, 2.05, 2.025, 2, 1.975, 1.95, 1.925, 1.9, 1.875, 1.85, 1.825, 1.8, 1.775, 1.75, 1.725, 1.7, 1.675, 1.65, 1.625, 1.6, 1.575, 1.55, 1.525, 1.5, 1.475, 1.45, 1.425, 1.4, 1.375, 1.35, 1.325, 1.3, 1.275, 1.25, 1.225, 1.1, 1.175, 1.15, 1.125, 1.1, 1.075, 1.05, or 1.025 wt. %.

Inventive MM-MOFs may be formed as polyhedral crystals having an average largest leg length, i.e., an edge of the octahedral or polyhedral crystal structure, though not necessarily the longest spatial dimension (which may include two legs of triangular bisectors, of which edges may be a hypotenuse) in a range of from 1 to 5 m. Exemplary average longest leg lengths may be, e.g., at least 1, 1.25, 1.5, 1.75, 2, 2.25, 2.5, 2.75, or 3 µm and/or up to 5, 4.875, 4.75, 4.625, 4.5, 4.375, 4.25, 4.125, 4, 3.875, 3.75, 3.625, 3.5, 3.375, 3.25, 3.125, 3, 2.875, 2.75, 2.625, or 2.5 µm. The morphology of the crystals of the MM-MOFs may be substantially, i.e., at least 50, 60, 70, 75, 80, 85, 90, or 95% octahedral prismatic, or some form of partial octahedral prism, such as fused, having lopped off points, etc.

Aspects of the invention provide $H_2$ gas storage containers, comprising any permutation of the inventive MM-MOF(s) described herein. Such containers may be cylindrical in shape and have metallic, e.g., steel, walls, which may have a thickness of, e.g., at least 1, 1.5, 2, 2.5, 3, 3.5, 4, 4.5, 5, 6, 7, 7.5, or 10 mm. The containers may generally be any $H_2$ gas storage container known in the art. Such containers may be underground storage containers, or containers designed to be carried in a vehicle, such as a car, truck, bus, semi-truck, earth-mover, or the like. Suitable containers may be configured to withstand pressures in a range of from, e.g., at least 25, 50, 75, 100, 125, 150, 175, 200, 225, 250, 275, 300, 325, 350, 375, or 400 bar and/or up to 2000, 1750, 1500, 1250, 1200, 1150, 1100, 1050, 1000, 950, 900, 850, 800, 750, 725, 700, 675, 650, 625, 600, 575, 550, 525, 500, 475, 450, 425, or 400 bar. Such containers may be configured to generate or remain under refrigeration, e.g., at no more than 45, 40, 35, 30, 25, 20, 15, 10, 5, 0, −5, −10, −15, −25, −50, −75, −100, −110, −125, −150, −175, −200, or −225° C. and/or at least 25, 50, 75, 100, 125, 150, 175, 200, 225, 250, or 275 K.

Aspects of the invention provide methods of storing $H_2$ gas, which methods may comprise contacting any permutation of the inventive MM-MOF(s) described herein with a fluid stream comprising $H_2$ gas. The fluid stream may be from a pressure swing adsorption unit and/or from a dehydrogenation unit at a plant, or from a further enriched $H_2$ gas source. The fluid may comprise at least 10, 25, 33, 40, 50, 60, 70, 75, 80, 85, 90, 91, 92, 92.5, 93, 94, 95, 96, 97, 97.5, 98, 99, 99.1, 99.5, or 99.9 vol. % $H_2$. The contacting may take place at any temperature, e.g., at no more than 45, 40, 35, 30, 25, 20, 15, 10, 5, 0, −5, −10, −15, −25, −50, −75, −100, −110, −125, −150, −175, −200, or −225° C. and/or at least 25, 50, 75, 100, 125, 150, 175, 200, 225, 250, or 275 K.

Aspects of the invention provide methods of making one or more MM-MOF, e.g., any permutation of the inventive MM-MOF(s) described herein. Such methods may comprise: soaking—i.e., combining, contacting, immersing, covering, submerging, or the like—a single-metal MOF, comprising copper cations and 1,3,5-benzenetricarboxylate bound into the MOF (such as Cu-BTC or any analog as described above), in a solution comprising a polar organic solvent and a salt of $Ni^{2+}$, $Zn^{2+}$, $Co^{2+}$, and/or $Fe^{2+}$ for 24 to 120 hours, i.e., at least 2, 2.25, 2.5, 2.75, 3, 3.25, or 3.5 days and/or up to 5, 4.5, 4, 3.75, 3.5, 3.25, 3, 2.75, 2.5, 2.25, or 2 days, at a temperature of −50 to 150° C., e.g., at −50, −40, −30, −20, −10, 0, 5, 10, 15, 20, or 25° C. and/or up to 150, 125, 115, 110, 105, 100, 95, 90, 85, 80, 75, 70, 65, 60, 55, 50, 45, 40, 35, 30, or 25° C., to form the inventive MM-MOF. The soaking/contacting may be repeated, e.g., 1, 2, 3, 4, or more times. Useful solvents may include 1, 2, 3, 4, 5, or more of N,N-dimethylformamide (DMF), N,N-diethylformamide, N,N-dimethylacetamide, N,N-diethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, methyl acetate, pet ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, methanol, ethanol, isopropanol, propanol, n-butanol, and/or water. The solvent may be a combination of several solvents, such as any of the aforementioned, independently in a weight relationship of, e.g., at least 15, 20, 25, 30, 33, 35, 40, 45, or 50 wt. % or vol. % and/or up to 90, 80, 75, 70, 67, 65, 60, 55, 50, 45, 40, 35, 33, 30, 25, or 20 wt. % or vol. %. The soaking may be performed with only one solvent, as desired.

The inventive MM-MOF may comprise the copper cations, the 1,3,5-benzenetricarboxylate, and $Ni^{2+}$, $Zn^{2+}$, $Co^{2+}$, and/or $Fe^{2+}$, e.g., in any proportion described above, wherein the MM-MOF and the single-metal MOF have a TBO topology. The MM-MOF may have a divalent metal cation (e.g., $Ni^{2+}$, $Zn^{2+}$, $Co^{2+}$, and/or $Fe^{2+}$) to copper cation, e.g., $Cu^{2+}$, ratio in a range of from 1:10 to 1:4, e.g., 1 $Ni^{2+}$, $Zn^{2+}$, $Co^{2+}$, and/or $Fe^{2+}$ to no more than 10, 9.5, 9, 8.75, 8.5, 8.25, 8, 7.75, 7.5, 7.25, 7, 6.75, 6.5, 6.25, 6, 5.75, 5.5, 5.25, or 5 $Cu^{2+}$ and/or up to 4, 4.25, 4.5, 4.75, 5, 5.25, 5.5, 5.75, 6, 6.25, 6.5, 6.75, 7, 7.25, 7.5, 7.75, or 8 $Cu^{2+}$. The MM-MOF may have a BET surface area in a range of from 600 to 1100 $m^2/g$, 820 to 945 $m^2/g$, (or any range described above), a pore volume in a range of from 0.300 to 0.400 $cm^3/g$ (or any range described above), a mean pore diameter in a range of from 1.50 to 1.70 nm (or any range described above), and/or a gravimetric capacity for $H_2$ of 1.02 to 2.00 wt % (or any range described above).

Aspects of the invention provide MM-MOFs comprising: a linker comprising 1,3,5-benzenetricarboxylate; copper (II) cations; and nickel (II) cations, wherein a powder x-ray diffraction pattern of the MM-MOF has at least 95, 96, 97, 97.5, 98, 99, 99.1, 99.5, or 99.9% identity with a powder x-ray diffraction pattern of a single-metal copper-1,3,5-benzenetricarboxylate MOF, and/or wherein MM-MOF is crystalline by PXRD and has TBO topology. Generally, inventive MM-MOFs may have at least 75, 80, 85, 90, 91, 92, 92.5, 93, 94, 95, 96, 97, 97.5, 98, 99, 99.1, 99.5, or 99.9% spatial identity to the single-metal MOF parent, e.g., Cu-BTC, based upon variation from a Cartesian ball-and-stick representation of the non-hydrogen atoms in three dimensional space, e.g., from x-ray crystallography.

Inventive MM-MOFs may have a gradient in concentration between a center of the MM-MOF and an outer perimeter of the MM-MOF, wherein concentration of the $Cu^{2+}$ is higher towards the center of the MM-MOF than the outer perimeter. For example, the core/center—i.e., the inner 10 or 5% of the MM-MOF crystal volume, centered around the center of gravity or geometric center—may have a concentration of $Cu^{2+}$ (relative to second, third, or further anions) that is, e.g., at least 1, 2, 2.5, 3.33, 5, 7.5, or 10% and/or up to 50, 40, 37.5, 33, 30, 27.5, 25, 22.5, 20, 17.5, 15, 12.5, 12, 11, 10, 9, 8, or 7.5%, greater than the concentration of $Cu^{2+}$ (relative to second, third, or further anions) at the perimeter—i.e., the outer 10 or 5% of the MM-MOF crystal volume.

Inventive MM-MOFs may comprise no more than 5, 4, 3, 2.5, 2, 1, 0.5, 0.1, 0.01, 0.001, 0.0001, or 0.00001 wt. %, relative to total MM-MOF weight, amorphous phases. Typically, the MM-MOFs will be at least 90, 91, 92, 92.5, 93, 94, 95, 96, 97, 97.5, 98, 99, 99.1, 99.5, or 99.9 wt. % crystalline.

Inventive MM-MOFs may comprise the $Ni^{2+}$ in a range of from 5 to 50, 7.5 to 40, 10 to 30, 12.5 to 27.5, 15 to 25, or 17.5 to 22.5 atom. %, or any range described above, optionally with a remainder of the $Cu^{2+}$. Typically, the remainder comprises at least 75, 80, 85, 90, 91, 92, 92.5, 93, 94, 95, 96, 97, 97.5, 98, 99, 99.1, 99.5, or 99.9 atom. % of $Cu^{2+}$, relative to the total weight of the metals/metallic ions incorporated into MM-MOF. Inventive MM-MOFs may have a gradient in $Cu^{2+}$ concentration between a center of the MM-MOF and an outer perimeter of the MM-MOF, wherein concentration of the $Cu^{2+}$ is higher towards the center of the MM-MOF than the outer perimeter, as described above.

Inventive MM-MOFs may have a crystalline structure having a pattern of diffusion-based exchange of mixed metal ions, i.e., non-$Cu^{2+}$ ions or more specifically $Zn^{2+}$, $Ni^{2+}$, $Co^{2+}$, and/or $Fe^{2+}$, particularly exhibiting a solvent-based diffusion gradient from the outer surface of the MM-MOF surface to the inner core of the crystals. Such a structure may be gained by post-synthetic exchange (PSE) of non-copper ions into a pre-existing Cu-BTC MOF structure.

Inventive materials need not comprise metal oxides, e.g., Ba, Be, Ca, Cd, Co, Cr, Cu, Fe, Hg, Mg, Mn, Ni, Pb, Pd, Sn, Sr, Ti, V, and/or Zn oxide(s), or may comprise no more than 40, 33, 25, 20, 15, 10, 7.5, 5, 4, 3, 2.5, 2, 1, 0.5, 0.1, 0.01, 0.001, 0.0001, or 0.00001 wt. %, relative to total MM-MOF weight, optionally including any coatings, embedded materials, or surface treatments, of such metal oxide(s), individually or in combination. Inventive materials need not comprise further ligands than 1,3,5-benzenetricarboxylate, including bidentate carboxylates, tridentate carboxylates, azoles, neutral ligands, squaric acids, and the like, such as e.g., oxalic acid, malonic acid, succinic acid, glutaric acid, phthalic acid, isophthalic acid, terephthalic acid, biphenyl-4,4'-dicarboxylic acid, citric acid, 1,2,3-triazole, pyrrodiazole, imidazole, pyrazole, 1,2,4-triazole, tetrazole, oxazole, isoxazole, isothiazole, thiazole, 1,2-oxathiolane, 1,3-oxathiolane, 1,2,5-oxadiazole, 1,3,4-thiadiazole, and/or 1,2,5-thiadiazole, or may comprise no more than 40, 33, 25, 20, 15, 10, 7.5, 5, 4, 3, 2.5, 2, 1, 0.5, 0.1, 0.01, 0.001, 0.0001, or 0.00001 wt. %, relative to total MM-MOF weight, optionally including any coatings, embedded materials, or surface treatments, of such ligand(s), individually or in combination.

Aspects of the invention provide isostructural mixed metal metal-organic frameworks (MM-MOFs) of 1,3,5-benzenetricarboxylate (BTC), i.e., M-Cu-BTC, where M may be Zn(II), Ni(II), Co(II), and/or Fe(II), particularly using post-synthetic exchange (PSE) with metal ions. Aspects of the invention comprise powder x-ray diffraction (PXRD) patterns of MM-MOFs which are substantially identical with those of single-metal Cu-BTC, i.e., having at least 75, 80, 85, 90, 91, 92, 92.5, 93, 94, 95, 96, 97, 97.5, 98, 99, 99.1, 99.5, or 99.9% lattice overlap with a single-metal Cu-BTC. Aspects of the invention provide MM-MOFs comprising no more than 15, 10, 7.5, 5, 4, 3, 2, 1, 0.5, 0.1, or 0% amorphous phases by scanning electron microscopy (SEM). Aspects of the invention include MM-MOFs showing successful metal exchanges using PSE method, as well as such exchange methods, detectable at least by inductively coupled plasma mass spectroscopy (ICP-MS). Aspects of the invention comprise syntheses of porous MM-MOFs confirmable by $N_2$ adsorption measurements. Aspects of the invention include hydrogen adsorption kinetics of synthesized porous materials, especially Ni(II) and Co(II) MM-MOFs, particularly of Cu-BTC, indicating improved $H_2$-material interaction and thus improved hydrogen-adsorption capacity, e.g., versus Cu-BTC. Aspects of the invention provide unsaturated mixed metal centers, e.g., made using PSE, as a strategy to enhance the hydrogen adsorption kinetics.

Aspects of the invention include isostructural mixed metal metal-organic frameworks (MM-MOFs) of 1,3,5-benzenetricarboxylate (BTC), for example, M-Cu-BTC, wherein M may be Zn(II), Co(II), Ni(II), and/or Fe(II), synthesized using the post-synthetic exchange (PSE) method. The metal-exchanged, supplemented, modified, etc., materials Zn—Cu-BTC, Ni—Cu-BTC, Fe—Cu-BTC, and Co—Cu-BTC may have gravimetric hydrogen ($H_2$) uptakes of up to 2.42 wt. % (e.g., up to 2, 2.05, 2.1, 2.15, 2.2, 2.25, 2.3, 2.33, 2.35, 2.4, 2.425, 2.45, 2.475, or 2.5 wt. %), 5.36 wt. % (e.g., up to 5, 5.05, 5.1, 5.15, 5.2, 5.225, 5.25, 5.275, 5.3, 5.325, 5.33, 5.35, 5.375, 5.4, 5.425, 5.45, 5.475, or 5.5 wt. %), 3.81 wt. % (e.g., up to 3.5, 3.55, 3.6, 3.65, 3.675, 3.7, 3.71, 3.72, 3.73, 3.74, 3.75, 3.76, 3.77, 3.78, 3.79, 3.8, 3.81, 3.82, 3.83, 3.84, or 3.85 wt. %), and 4.26 wt. % (e.g., up to 3.85, 3.9, 3.95, 4, 4.025, 4.05, 4.075, 4.1, 4.125, 4.15, 4.175, 4.2, 4.225, 4.25, 4.275, 4.3, 4.325, 4.33, or 4.35 wt. %), respectively. Inventive Ni—Cu-BTC may have a gravimetric uptake of hydrogen ($H_2$) of up to 4, 4.25, 4.33, 4.5, 4.67, 4.75, 5, 5.1, 5.125, 5.15, 5.175, 5.2, 5.25, 5.3, 5.33, 5.35, 5.36, or 5.4 wt. % (and/or any of the aforementioned endpoints). The metal exchanged Co—Cu-BTC also surpass the reported gravimetric uptake of Cu-BTC with 3.5, 3.55, 3.6, 3.65, 3.67, 3.7, 3.75, 3.8, 3.85, 3.9, 3.933, 3.967, 4, 4.033, 4.067, 4.1, 4.133, 4.167, 4.233, 4.26, 4.267, or 4.3, 4.4, or 4.5 wt. % (and/or any of the aforementioned endpoints). Without wishing to be bound to any particular theory, the improvement of gravimetric uptake in Ni—Cu-BTC may be mainly due to the increase in binding enthalpy of $H_2$ with the unsaturated metal sites after the partially exchanging the Cu(II) with Zn(II), Co(II), Ni(II), and/or Fe(II), e.g., 50, 60, 70, 75, 80, 85, 90, 91, 92, 92.5, 93, 94, 95, 96, 97, 97.5, 98, 99, 99.1, 99.5, or 99.9 atom. %. Aspects of the invention comprise binding enthalpy increases in the MM-MOFs, for example due to the higher charge densities of such metals, e.g., Ni(II). Aspects of the invention include polarizing $H_2$ with metal sites so as to provide the primary binding sites for $H_2$ inside the pores of the MM-Cu-BTCs, and subsequently enhance the gravimetric uptake of the materials.

Examples

Materials and Methods: All reagents were used as purchased without further purification. Metal nitrates and 1,3,5-tricarboxylic acid linker were purchased from Sigma Aldrich Co, Ltd. Powder diffraction data were collected using Rigaku Miniflex II diffractometer equipped with Cu-K$\alpha$ radiation source over the 2$\theta$ range between 3° and 50°. Metal-organic framework (MOF) crystals were imaged by Quattro ESEM scanning electron microscope. Thermogravimetric analysis (TGA) was performed on a TA SDT 2960 thermal analyzer. The samples were ground right before TGA experiments to minimize exposure to moisture. Roughly 3 to 5 mg of each sample were heated to 600° C. at a rate of 5° C./min while under a flow of nitrogen (atmosphere) at a rate of 50 mL/min.

Synthesis of Metal-Organic Frameworks (Mofs)

The synthesis of Cu-BTC: In a typical procedure, a mixture of $Cu(NO_3)_2·3H_2O$ (0.438 g, 1.81 mmol) and 1,3,5-benzenetricarboxylic acid (BTC) (0.236 g, 1.12 mmol) were completely dissolved in a solvent mixture containing 2 mL N,N-dimethylformamide (DMF), 2 mL deionized water, and 2 mL ethanol in a tightly sealed 20 mL scintillation vial. The tightly covered vial was placed in an isothermal oven at 85° C. for 20 hours to yield small, blue octahedral crystals. After cooling the vials to room temperature, the mother liquor was decanted and the tiny crystals were rinsed three times with DMF. The solvent was decanted, and the remaining solid was washed nine times with dichloromethane (DCM), each time letting the solid soak in dichloromethane for 8 hours, then decanting. That is, the dichloromethane exchange was conducted for 9×8 hours, or 72 hours in total.

Post-Synthetic Exchange (PSE): M-Cu-BTC was prepared using a post-synthetic exchange method. Portions of Cu-BTC crystals synthesized as described above were soaked in 0.5 M N,N-dimethylformamide (DMF) solutions of $Ni(NO_3)_2·6H_2O$, $Zn(NO_3)_2·6H_2O$, $Co(NO_3)_2·6H_2O$, or $FeCl_2·6H_2O$ for 72 hours in total, i.e., 9 washings at room temperature, each time letting the solid soak in DMF for 8 hours. At the end of soaking, solutions of metal ions were decanted, and the transmetallated crystals of M-Cu-BTC were harvested by filtration. MM-MOFs crystals were washed thoroughly with DMF several times and then soaked in DMF for complete removal of residual metal ions. The resulting cation-exchanged MOFs were activated with dichloromethane (DCM) nine times, each time allowing the solid soak in DCM for 8 hours.

Measurement of Gas Adsorption Isotherms: About 100.0 mg were degassed at 50° C. for 4 hours and at 75° C. for 2 more hours, then the sample cell was weighed and mounted into the Quantachrome Autosorb iQ-C-MP analysis station to measure the adsorption isotherms at liquid nitrogen temperature, i.e., 77 K. In the hydrogen storage measurement, high purity hydrogen (99.9995%) and an 100.0 mg sample were used. The regulator and pipe were flushed with hydrogen before connecting to the analyzer. The temperature was maintained at 77 K with liquid nitrogen throughout all measurements.

Referring now to the drawings, wherein like reference numerals designate identical or corresponding parts throughout the several views.

FIG. 1 shows a ball and stick representation of copper-1,3,5-benzenetricarboxylate, i.e., Cu-BTC as abbreviated herein, a highly porous metal-organic framework MOF of the general repeating unit structure $[Cu_3(BTC)_2(H_2O)_3]_n$, wherein BTC is benzene-1,3,5-tricarboxylate, having interconnected $[Cu_2(O_2CR)_4]$ units, wherein R is an aromatic ring. Chui and coworkers were the first reported the synthesis of Cu-BTC in Science 1999, 283, 1148-1150, naming it HKUST-1. Cu-BTC has a 3-dimensional system of channels with a pore size of 1 nm and an accessible porosity of about 40% in the solid. The single-crystal X-ray analysis of Cu-BTC indicates that the framework is composed of dimeric cupric tetracarboxylate building units, with a Cu—Cu inter-nuclear separation of 2.628(2) Å.

The Cu-BTC framework has been found to be neutral because the twelve carboxylate oxygens from the two BTC ligands bind to four coordination sites on each of the three $Cu^{2+}$ ions of the formula unit. Hence each Cu atom completes its pseudo-octahedral coordination sphere with the presence of axial aqua ligands opposite the Cu—Cu dimer. A tetracarboxylate unit would provide a structural motif with potential four-fold symmetry, and the trimesic acid (BTC) provides a three-fold symmetry element. The origin of the nano-channels can be considered to arise from the formation of larger octahedral secondary building units (SBUs). The main SBU in Cu-BTC is an octahedral unit with $Cu^{2+}$ at its 6 vertices and 4 trimesate ions tetrahedrally disposed as "panels" for four of the eight triangular faces of the octahedron.

The Cu-BTC was synthesized as described in *Science* 1999, 283, 1148-1150, which is incorporated by reference herein in its entirety. The crystalline samples of the inventive mixed metal metal-organic frameworks (MM-MOFs) obtained by direct metal exchange in N,N-dimethylformamide (DMF) via post-synthetic exchange (PSE) for 72 hours at room temperature. The MM-MOFs, synthesized as described above, were washed five times with DMF to avoid any contamination by unreacted metal salts residing in the pores which may have affected the metal analysis. Thereafter, the DMF-washed Cu-BTC and MM-MOFs, synthesized as described above, were exchanged 12 times with 15 mL of anhydrous dichloromethane (DCM), then placed under vacuum at $10^{-3}$ torr, e.g., acceptable pressures may be in a range of at least $10^{-5}$, $5^{-5}$, $10^{-4}$, $5^{-4}$, $10^{-3}$, $5^{-3}$, or $10^{-2}$ torr and/or up to 760, 500, 250, 100, 50, 25, 10, 5, 1, 0.1, 0.01, or 0.001 torr, at room temperature.

Figure 2:
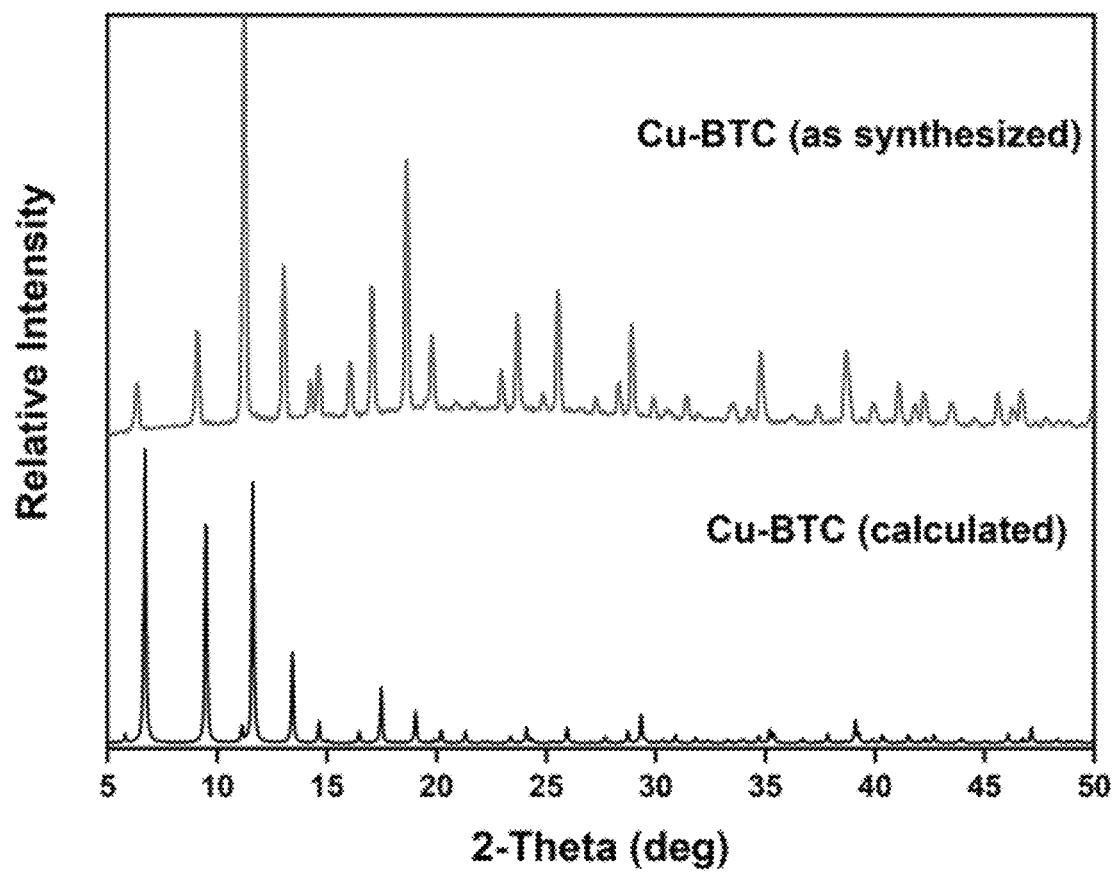
FIG. 2 shows a powder x-ray diffraction (PXRD) pattern of Cu-BTC simulated from crystal structure (lower pattern) and Cu-BTC as synthesized (upper pattern)
Figure 3:
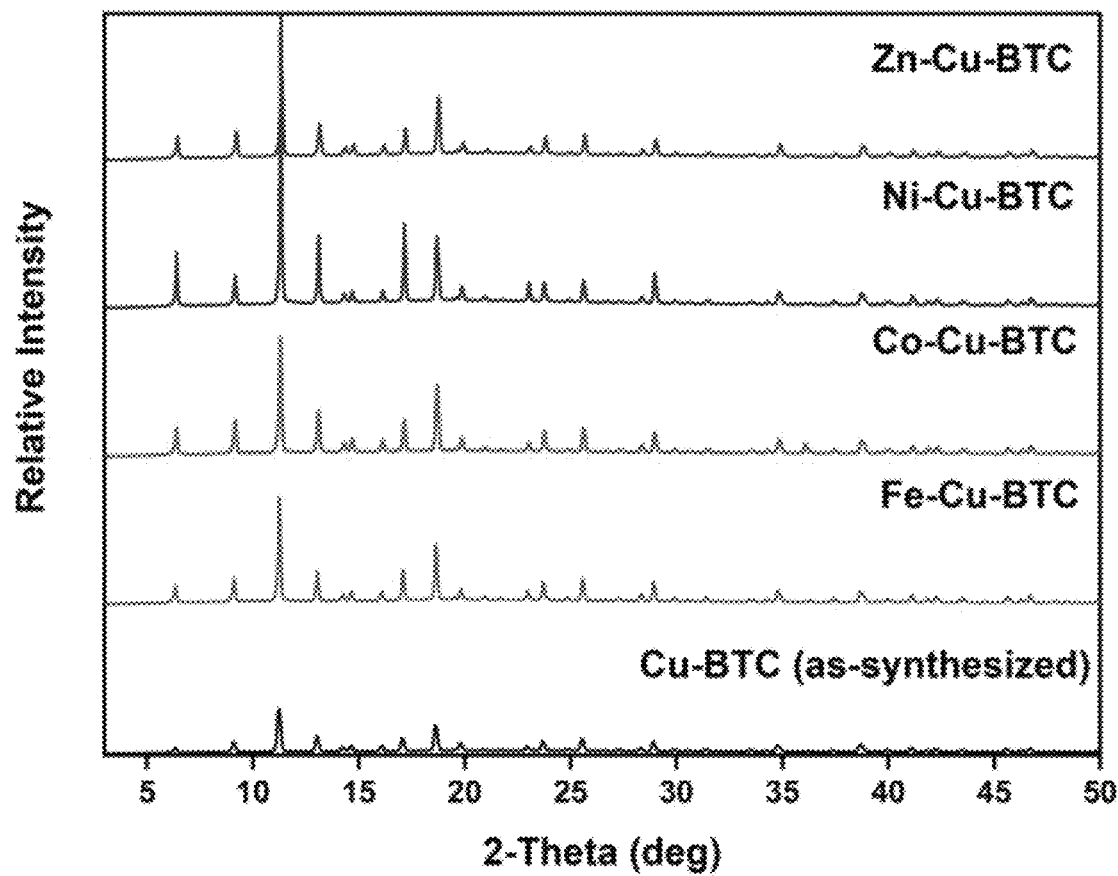
FIG. 3 shows PXRD patterns of a Cu-BTC MOF as synthesized (bottom pattern) and M-Cu-BTC as-synthesized MOFs, including Fe—Cu-BTC (second pattern from bottom), Co—Cu-BTC (third pattern from bottom), Ni—Cu-BTC (fourth pattern from bottom), and Zn—Cu-BTC (top pattern)
Figure 4:
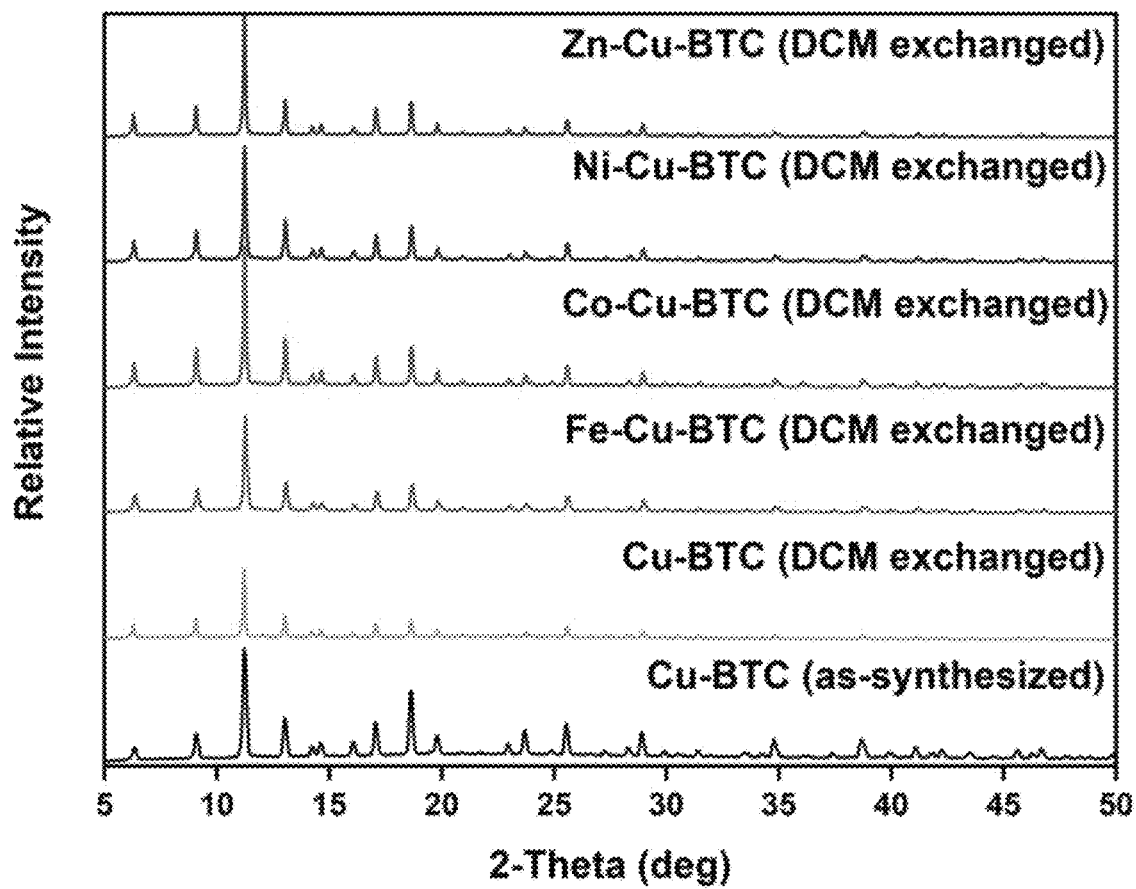
FIG. 4 shows PXRD patterns of dichloromethane (DCM)-exchanged Cu-BTC (bottom pattern) and dichloromethane (DCM)-exchanged M-Cu-BTC MOFs, including Fe—Cu-BTC (second pattern from bottom), Co—Cu-BTC (third pattern from bottom), Ni—Cu-BTC (fourth pattern from bottom), and Zn—Cu-BTC (top pattern)

FIG. 2 to 4 show powder x-ray diffraction (PXRD) patterns of the Cu-BTC and mixed metal metal-organic framework (MM-MOF) samples, synthesized and washed with N,N-dimethylformamide (DMF) and dichloromethane (DCM) as described above. As discussed below, the porosity of these DMF and DCM-washed Cu-BTC and MM-MOF samples indicated an absence of any metal ions in the pores. The powder x-ray diffraction (PXRD) pattern of the as-synthesized Cu-BTC matches well with the simulated pattern from Cu-BTC crystal structure as seen in FIG. 2. The peak intensity difference of reflections around 5° and 15° were observed to arise from texture effects. In FIG. 3, the PXRD patterns of MM-MOFs indicate that the modified MOFs are (substantially) isostructural to Cu-BTC. This high crystallinity of the MM-MOFs from PXRD pattern indicates that the MOFs retained the structure after PSE method. The exemplary Ni—Cu-BTC sample shows higher crystallinity than the other exemplary metal-exchanged MOFs. FIG. 4 shows that all PXRD patterns of the MM-MOFs series exchanged with DCM after 3 days match well with the parent Cu-BTC structure.

The incorporation of metal ions into the mixed metal metal-organic frameworks (MM-MOFs) after post-synthetic exchange (PSE) was identified by inductively coupled plasma mass spectrometry (ICP-MS) analysis. The ICP-MS analysis of the exemplary Zn—Cu-BTC MM-MOF indicated a metal exchange of 15 atom. %, e.g., at least 10, 11, 12, 12.5, 13, 13.5, 14, 14.5, 15, 15.5, 16, 16.5, 17, or 17.5 atom. % and/or up to 20, 19, 18, 17.5, 17, 16.5, 16, 15.5, 15, 14.5, or 14 atom. %, with respect to Cu(II) metal ions. The ICP-MS analysis of the exemplary Ni—Cu-BTC MM-MOF indicated a metal exchange of 20 atom. %, e.g., at least 15, 16, 17, 17.5, 18, 18.5, 19, 19.5, 20, 20.5, 21, 21.5, 22, 22.5, 23, 24, or 25 atom. % and/or up to 30, 27.5, 25, 24, 23, 22.5, 22, 21.5, 21, 20.5, or 20 atom. %, with respect to Cu(II) metal ions. The ICP-MS analysis of the exemplary Co—Cu-BTC MM-MOF indicated a metal exchange of 17 atom. %, e.g., at least 12.5, 13, 13.5, 14, 14.5, 15, 15.5, 16, 16.5, 17, 17.5, 18, 18.5, 19, 19.5, 20, 20.5, 21, 21.5, 22, or 22.5 atom. % and/or up to 25, 24, 23, 22, 21, 20, 19.5, 19, 18.5, 18, or 17.5 atom. %, with respect to Cu(II) metal ions. The ICP-MS analysis of the exemplary Fe—Cu-BTC MM-MOF indicates that the metal exchange of 16 atom. %, e.g., at least 12, 12.5, 13, 13.5, 14, 14.5, 15, 15.5, 16, 16.5, 17, 17.5, 18, 18.5, 19, 19.5, 20, 20.5, or 21 atom. % and/or up to 22.5, 21, 20, 19.5, 19, 18.5, 18, 17.5, 17, 16.5, or 16 atom. %, with respect to Cu(II) metal ions.

Figure 5A:
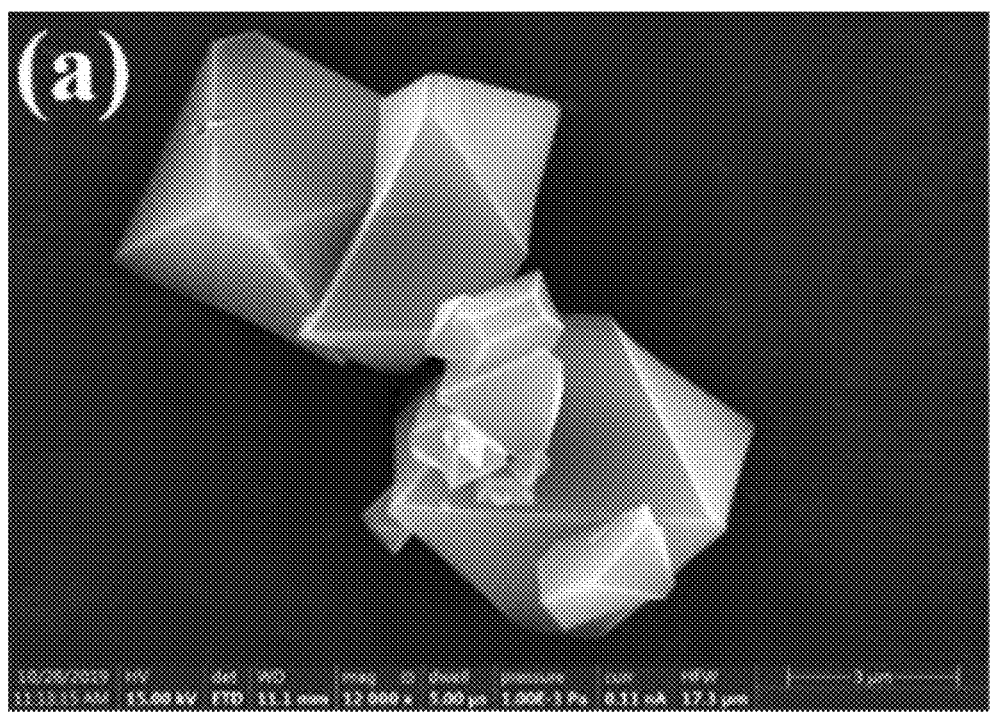
FIG. 5A shows a scanning electron microscope (SEM) image of Cu-BTC on a 3 μm scale.
Figure 5B:
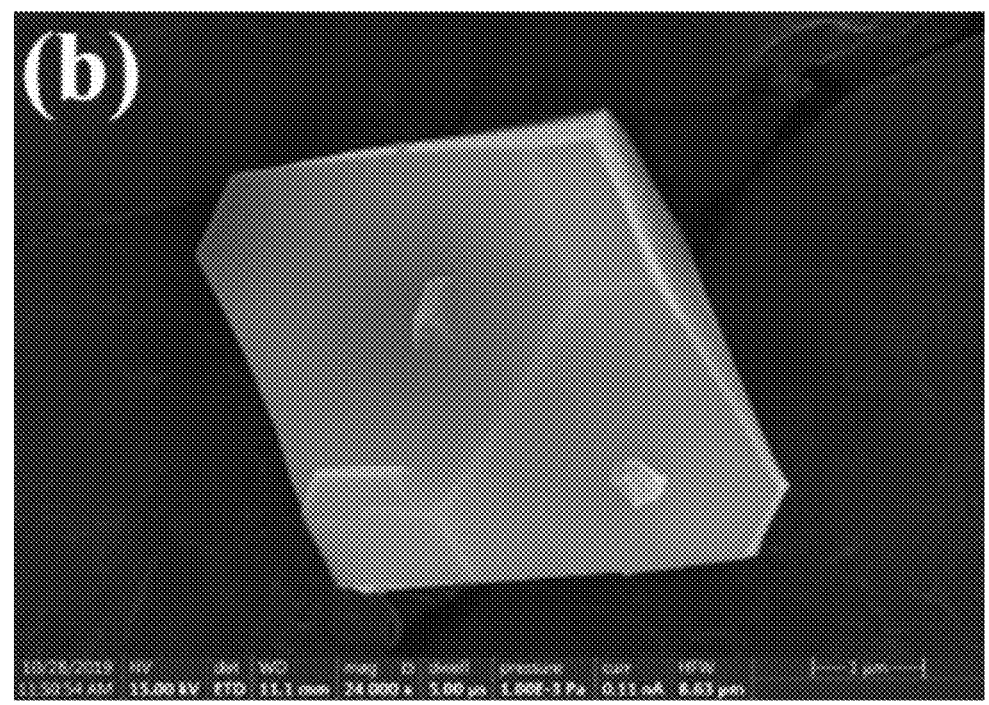
FIG. 5B shows an SEM image of Cu-BTC on a 1 μm scale.
Figure 5C:
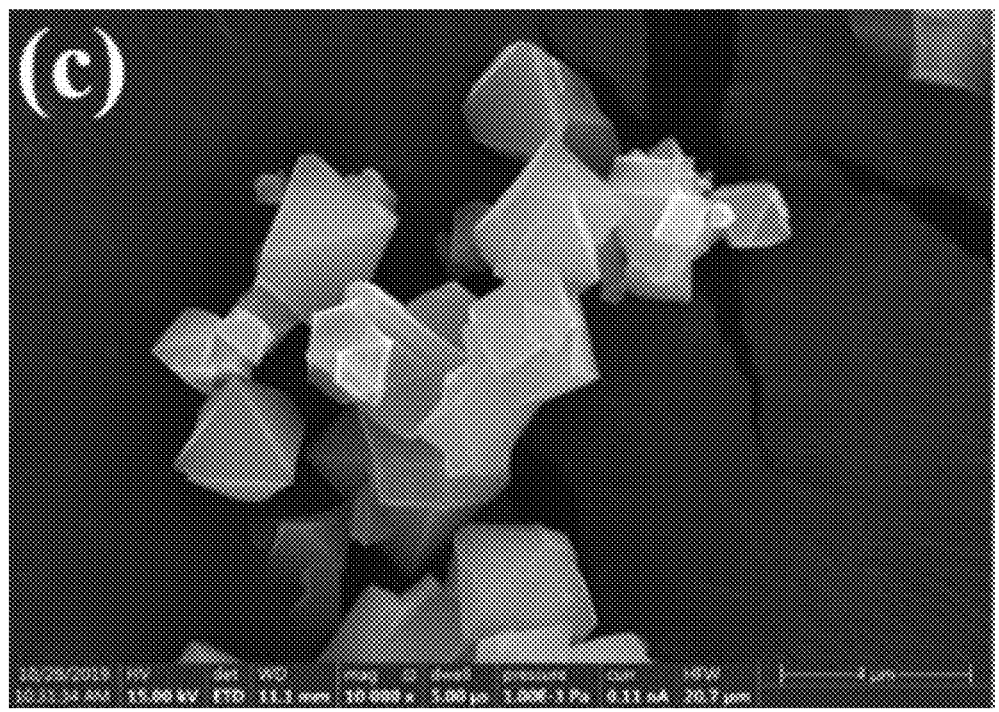
FIG. 5C shows an SEM image of Co—Cu-BTC on a 4 μm scale.
Figure 5D:
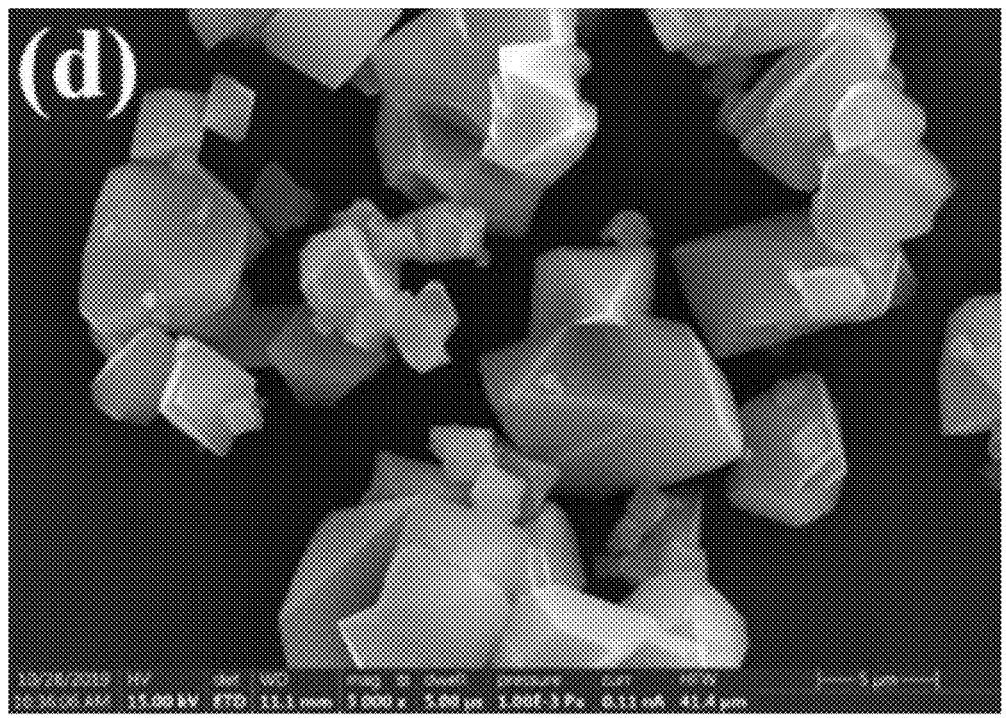
FIG. 5D shows an SEM image of Co—Cu-BTC on a 5 μm scale.
Figure 5E:
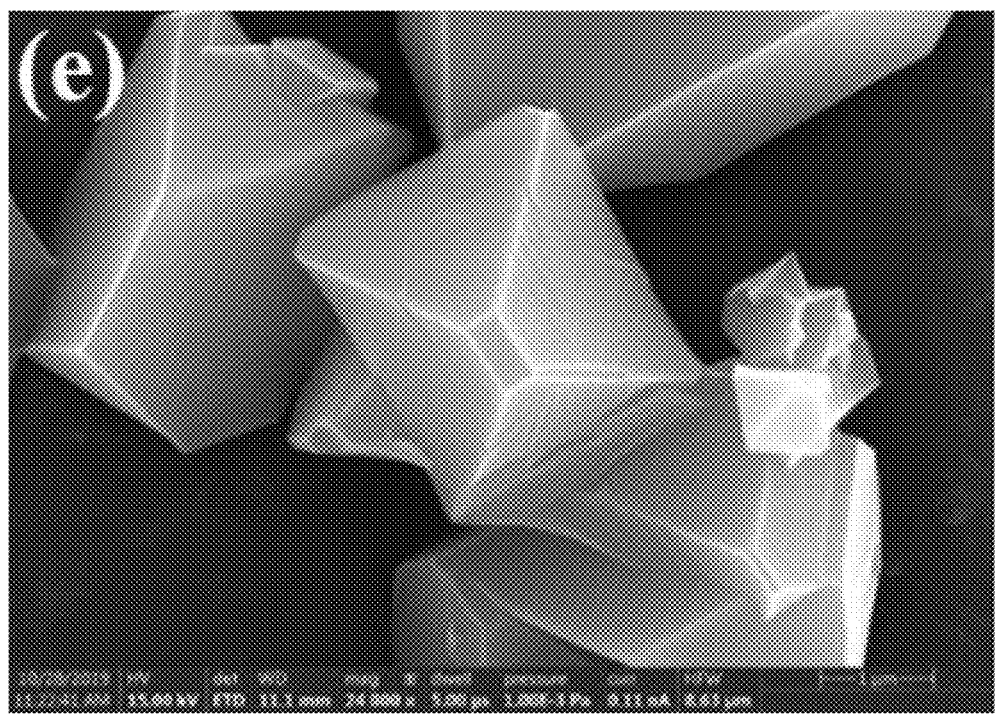
FIG. 5E shows an SEM image of Ni—Cu-BTC on a 1 μm scale.
Figure 5F:
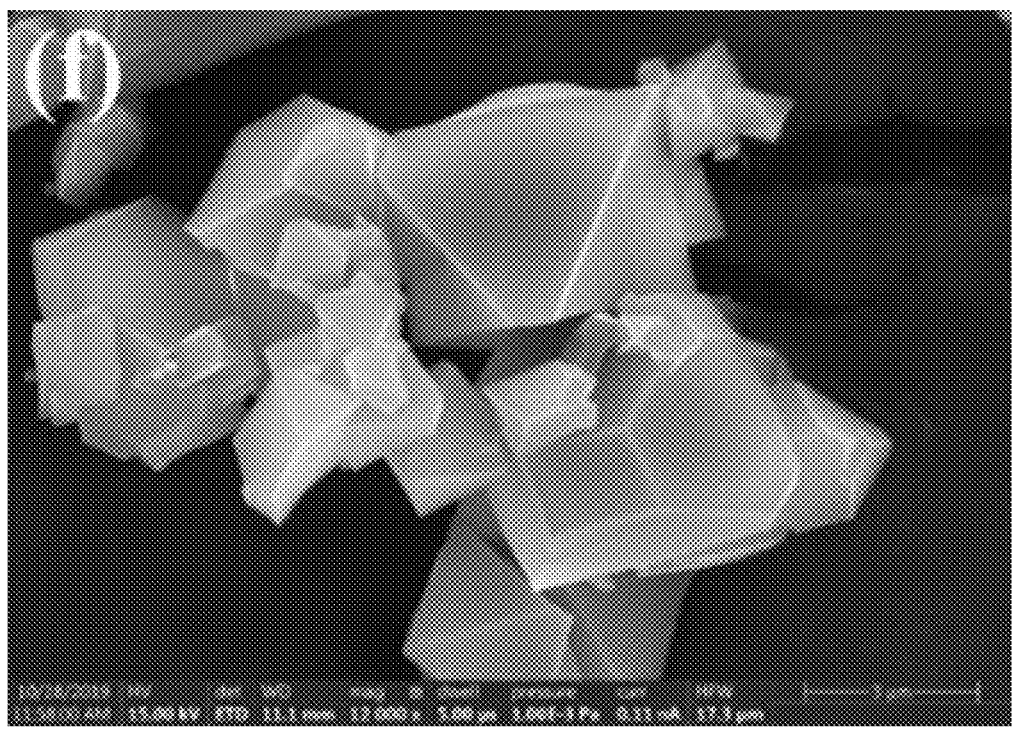
FIG. 5F shows an SEM image of Ni—Cu-BTC on a 3 μm scale.

The inductively coupled plasma mass spectrometry (ICP-MS) data demonstrate that mixed metal metal-organic frameworks (MM-MOFs) contains partially exchanged metal ions from the parent MOF. Although starting molar ratio of metal ion is same for all the MOFs, the observed trend found that Ni(II) is more extensively incorporated in the Cu-BTC structure than other metal ions. The replacement of metal ions can be also affected the solubility of metal nitrates, reactivity, ionic radius of metal ion, and the pH of the reaction/exchange mixture. FIG. 5A to 5F shows scanning electron microscope (SEM) images of the formation of the crystalline materials by the mixed metal metal-organic frameworks (MM-MOFs). The SEM analyses indicate that no contamination or growth of another phase occurred during the metal exchanges. The Cu-BTC sample, prepared as described above, displayed with polyhedral (octahedral) crystal with sizes of average longest dimension 1 to 5 μm as seen in FIGS. 5A and 5B. As seen in FIGS. 5A and 5B, the Cu-BTC crystals have an octahedral prismatic structure with optionally flattened tips (i.e., having a tetrahedral prism sliced off, leaving behind a planar surface, rather than a point), optionally having irregular prismatic growths off a plane and/or edge, and/or optionally fused with other prismatic crystals.

FIG. 5C to 5F show, as prototypes, the SEM images of Ni(II) and Co(II)-exchanged mixed metal metal-organic frameworks (MM-MOFs), which were investigated to compare the morphology with the parent MOF, Cu-BTC. As seen in FIG. 5C to 5F the images of Co—Cu-BTC and Ni—Cu-BTC also shows similar or the same polyhedral crystals, particularly octahedral crystals, with sizes in average 1 to 5 m without amorphous phases, for example, the square cross-section of the octahedral forms may have average leg lengths, and/or legs on conjoining fused triangular surfaces in a range of from, e.g., at least 1, 1.25, 1.5, 1.75, 2, 2.25, 2.5, 2.75, 3, 3.25, 3.5, 3.75, or 4 μm and/or up to 10, 9, 8, 7.5, 7, 6.5, 6, 5.5, 5, 4.75, 4.5, 4.25, 4, 3.75, 3.5, 3.25, 3, 2.75, or 2.5 μm, and/or legs on conjoining fused triangular surfaces may be, e.g., at least 75, 80, 85, 90, 91, 92, 92.5, 93, 94, 95, 96, 97, 97.5, 98, 99, 99.1, 99.5, or 99.9% the average length of the legs of the square cross-section of the octahedral forms. That is, the triangular faces may be equilateral or isosceles in shape. The crystals may include further, non-octahedral (or severed octahedral) structures, such as rectangular, square, tetrahedral, rhomboidal (e.g., rhombic dodecahedral, rhombic triacontahedral, rhombic icosahedral, rhombic enneacontahedral, and/or rhombohedral), trapezoidal, and/or irregular prisms, and the like, generally comprising at least 75, 85, 90, 92.5, 95, 97.5, 99, or 99.9% convex polyhedrons. The SEM images also display homogenous nanocrystallites without any other morphology.

Figure 6:
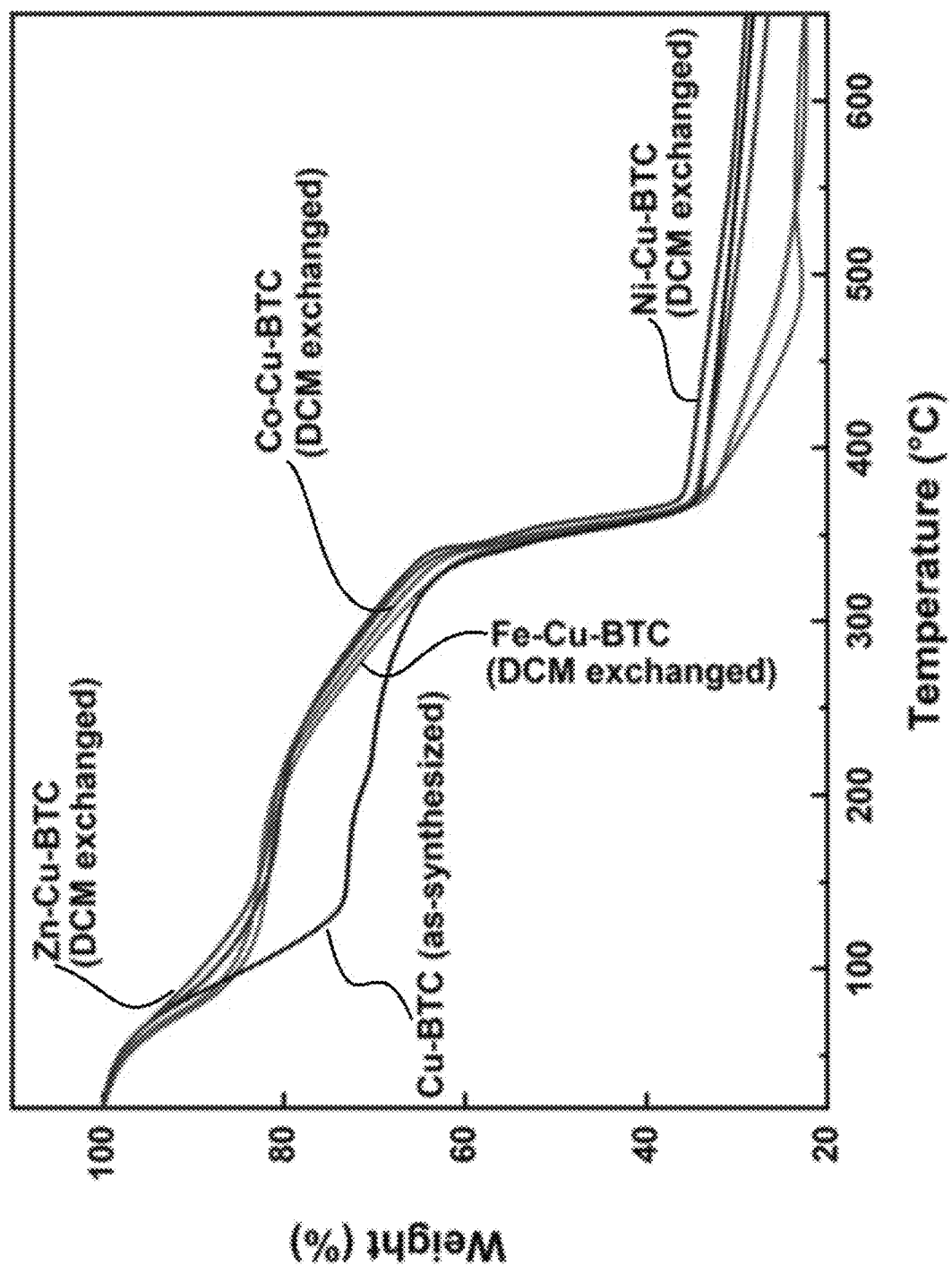
FIG. 6 shows thermogravimetric analysis (TGA) plots of Cu-BTC as-synthesized and dichloromethane (DCM)-exchanged MM-MOFs, including Fe—Cu-BTC, Co—Cu-BTC, Ni—Cu-BTC, and Zn—Cu-BTC.

FIG. 6 shows the thermogravimetric analysis (TGA) plots conducted on the Cu-1,3,5-benzenetricarboxylate (BTC) and dichloromethane (DCM)-exchanged mixed metal-Cu-BTC samples prepared as described above. The TGA measurements of the samples after exchange in DCM are consistent with the weight-loss of reported Cu-BTC, with noticeable variation of the Cu-BTC sample in its deeper weight loss between 100 to 300° C., and the more significant weight loss of the Co—Cu-BTC and Fe—Cu-BTC samples in the range of roughly 365° C. onwards. As seen in FIG. 6, the trajectory of the Ni—Cu-BTC and Zn—Cu-BTC samples above 365° C. closely parallel (e.g., within 5, 4, 3, 2.5, 2, 1.5, 1, or 0.5 wt. % difference) that of Cu-BCT, with Ni—Cu-BTC having equal or less weight loss across the entire temperature range than Cu-BTC. The initial weight loss in all samples can be attributed to the loss of guest molecules, after which point the TGA plots of the materials are roughly stable up to 250° C., whereafter a sudden weight loss due to the collapse of the framework occurs. All guest molecules are typically removed above 75° C., which can be used for the initial screening of nitrogen adsorption measurements. To generate the unsaturated metal sites, the samples typically need to be heated above 75° C., such as 150 to 200° C., or at least 80, 85, 90, 95, 100, 105, 110, 115, 120, 125, 130, 135, 140, 145, 150, 155, 160, 165, 170, or 175° C. and/or up to 350, 325, 300, 290, 280, 275, 270, 265, 260, 255, 250, 245, 240, 235, 230, 225, 220, 215, 210, 205, 200, 195, 190, 185, 180, or 175° C.

Figure 7:
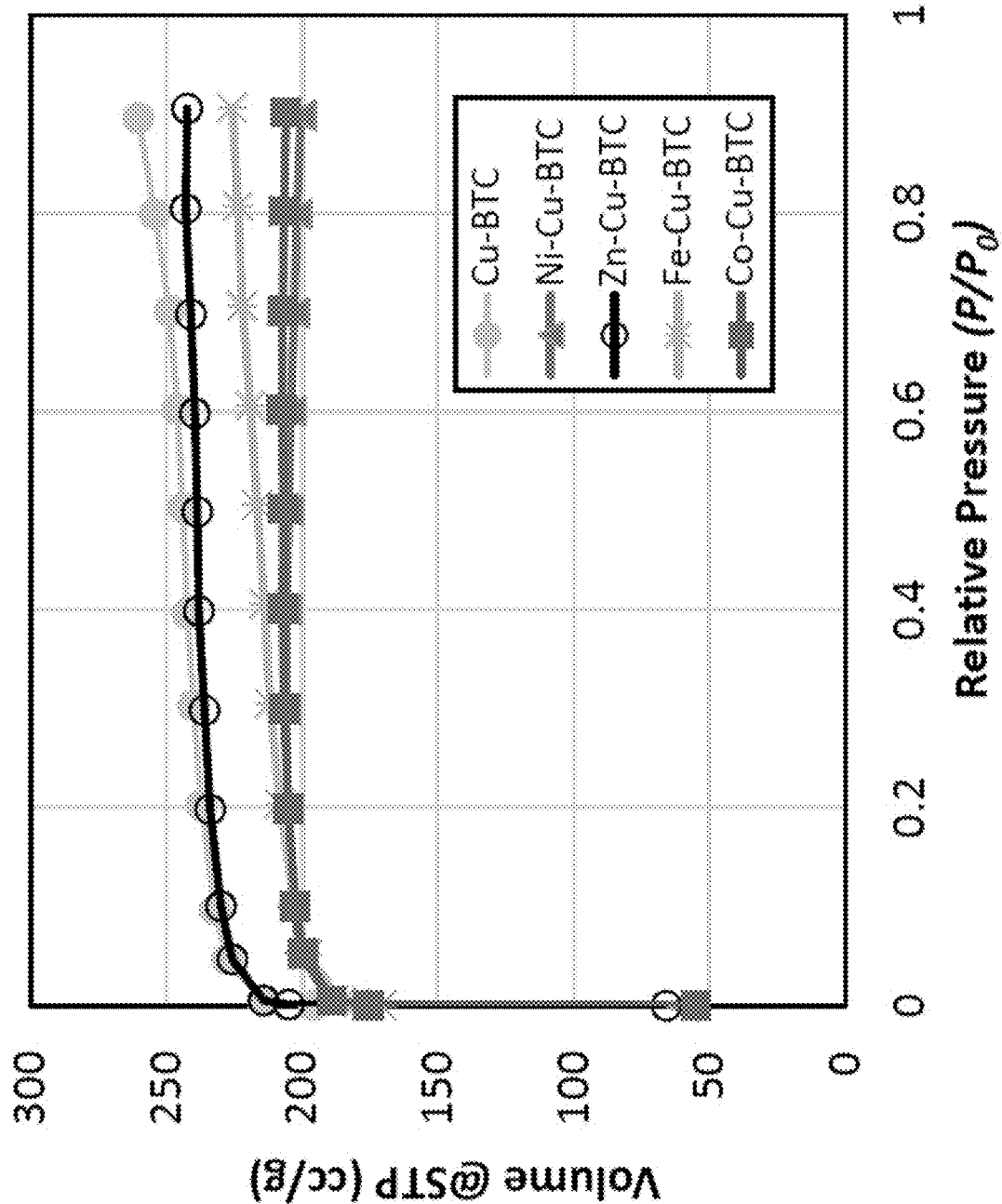
FIG. 7 shows nitrogen adsorption isotherms at 77 K of Cu-BTC, Fe—Cu-BTC, Co—Cu-BTC, Ni—Cu-BTC, and Zn—Cu-BTC.
Figure 8:
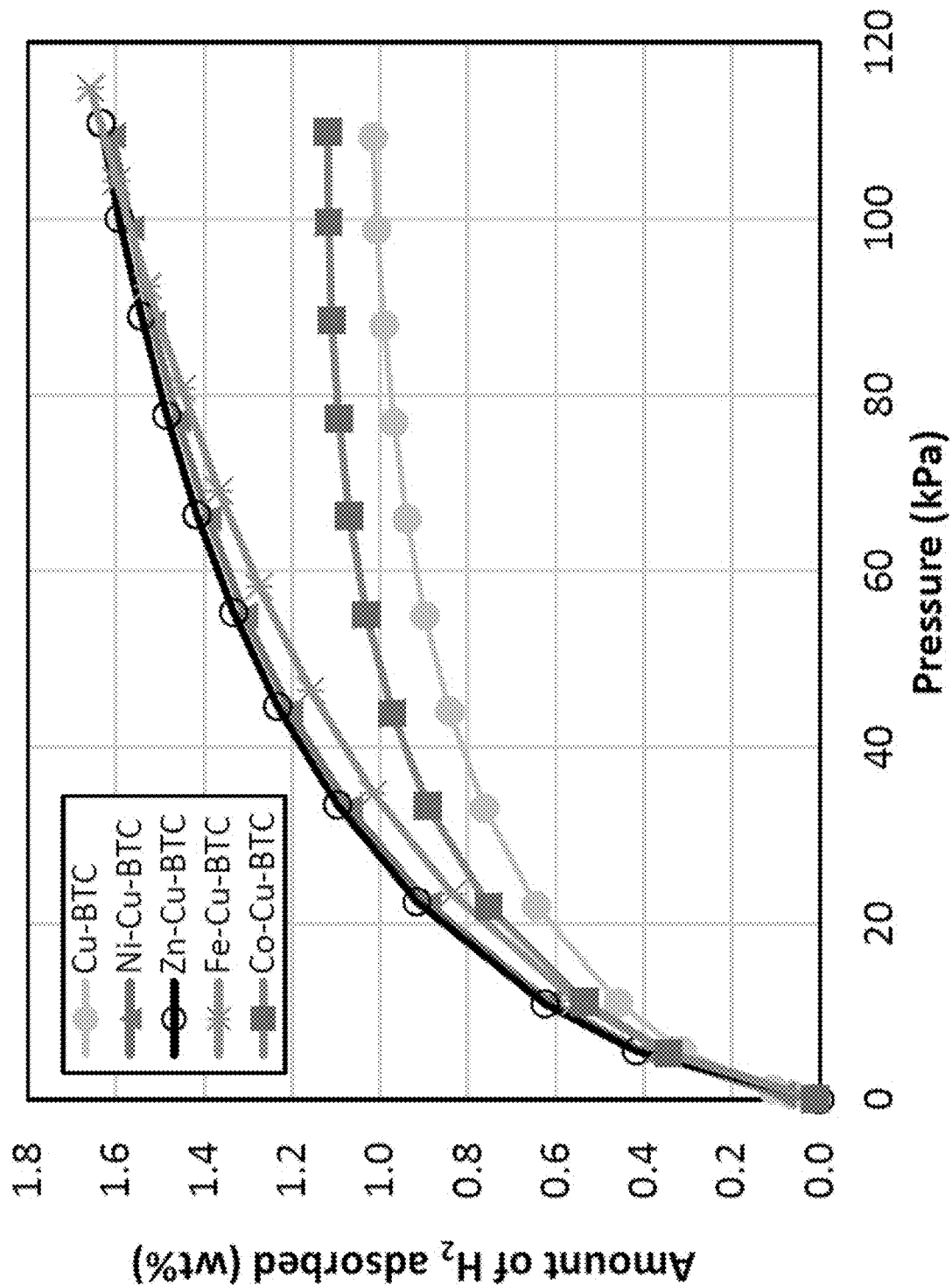
FIG. 8 shows hydrogen adsorption isotherms at 77 K of Cu-BTC, Fe—Cu-BTC, Co—Cu—BTC, Ni—Cu-BTC, and Zn—Cu-BTC.

FIGS. 7 and 8 show surface area and hydrogen ($H_2$) adsorption measurements for Cu-BTC and MM-Cu-BTC samples. In order to identify the hydrogen adsorption capacities of the copper-1,3,5-benzenetricarboxylate (Cu-BTC) and mixed metal Cu-BTC (MM-Cu-BTC) samples were washed 9 times with dichloromethane (DCM), each time letting the solid soak in DCM for 8 hours, i.e., for 72 hours. The metal-exchanged materials were put into an Autosorb apparatus for degassing and measuring the surface area. The degassing was conducted at 1500 for 10 hours. The gas adsorption measurements indicated that all guest molecules within the pores had been evacuated from the mixed metal metal-organic frameworks (MM-MOFs), and that the MOFs were porous. The BET surface area obtained for the Cu-BTC sample prepared as described above was comparable to surface areas reported in the art. The nitrogen ($N_2$) adsorption isotherm at 77 K for the Cu-BTC sample, prepared as described above, was observed to be a type-I isotherm indicating better uptake than observed for the MM-MOF samples, Zn—Cu-BTC, Ni—Cu-BTC, Co—Cu-BTC, and Fe—Cu-BTC, as seen in FIG. 7. The BET surface area and pore parameters obtained for the Cu-BTC and MM-MOF samples are provided below in Table 1.

TABLE 1

The Brunauer-Emmett-Teller (BET) surface area and pore parameters of Cu-BTC and mixed metal Cu-BTC samples.

| (MM-)MOF | BET Surface Area ($m^2$/g) | Langmuir Surface Area ($m^2$/g) | Micro-Pore Volume ($cm^3$/g) | Average Pore Diameter (nm) |
| --- | --- | --- | --- | --- |
| Cu-BTC | 945 | 1132 | 0.404 | 1.709 |
| Zn—Cu-BTC | 938 | 1055 | 0.376 | 1.603 |
| Ni—Cu-BTC | 828 | 879 | 0.311 | 1.503 |
| Fe—Cu-BTC | 820 | 980 | 0.350 | 1.708 |
| Co—Cu-BTC | 822 | 907 | 0.319 | 1.553 |

The Cu-BTC sample exhibited the highest surface area of the MOF samples with 945 $m^2$/g alongside the largest pore volume of 0.404 $cm^3$/g. The Cu-BTC sample prepared as described above was measured to have a lower surface area value, i.e., 945 $m^2$/g, than the surface area reported in of 1944 $m^2$/g. It is believed that the 945 $m^2$/g measurement fails to account for the possibility that all of the coordinated water may not have been removed during the activation due to the relatively low temperature used. The surface area and pore volume each reduced upon the incorporation of second or mixed metal ions into the unsaturated metal centers. This may be due to the textural property degradation after the metal exchange.

FIG. 8 shows the hydrogen adsorption isotherms of the copper-1,3,5-benzenetricarboxylate (Cu-BTC) and mixed metal Cu-BTC (MM-Cu-BTC) samples. In order to investigate the hydrogen ($H_2$) storage properties of the Cu-BTC and mixed metal Cu-BTC samples, low-pressure (110 to 114 kPa) $H_2$ isotherms were measured at 77 K. The gravimetric uptake of the samples at low pressure and 77 K given in Table 2.

TABLE 2

Gravimetric hydrogen adsorption of the Cu-BTC and M—Cu-BTC samples.

| (MM-)MOF | BET Surface Area ($m^2$/g) | Temperature (K) | Pressure (kPa) | Total $H_2$ Gravimetric Capacity (wt. %) | Increase in $H_2$ capacity*(%) |
| --- | --- | --- | --- | --- | --- |
| Cu-BTC | 945 | 77 | 114 | 1.02 | — |
| Zn—Cu-BTC | 938 | 77 | 114 | 1.63 | 59.8 |
| Ni—Cu-BTC | 828 | 77 | 111 | 1.61 | 57.8 |
| Fe—Cu-BTC | 820 | 77 | 114 | 1.63 | 59.8 |
| Co—Cu-BTC | 822 | 77 | 110 | 1.12 | 9.8 |

*Relative to the parent MOF (Cu-BTC)

Although, the Cu-BTC sample, prepared as described in the Examples, exhibited a lower BET surface area compared to the Cu-BTC surface area reported in the art, the gravimetric hydrogen ($H_2$) adsorption of the Cu-BTC prepared according to the Examples exhibits activity at 77 K of 1.02 wt. % gravimetric uptake at 77K and about 1 bar, surpassing the gravimetric uptake of Cu-BTC of the art. The exemplary metal-exchanged materials, i.e., Zn—Cu-BTC, Ni—Cu-BTC, Fe—Cu-BTC, and Co—Cu-BTC, indicate gravimetric hydrogen ($H_2$) uptake of 1.63 wt. % (Zn—Cu-BTC), 1.61 wt. % (Ni—Cu-BTC), 1.63 wt. % (Fe—Cu-BTC), and 1.12 wt. % (Co—Cu-BTC), respectively. For example, inventive Zn—Cu-BTC MOFs could exhibit gravimetric hydrogen ($H_2$) uptakes in a range of from, e.g., at least 21, 1.025, 1.05, 1.075, 1.1, 1.15, 1.2, 1.25, 1.3, 1.35, 1.375, 1.4, 1.425, 1.45, 1.475, 1.5, 1.525, 1.55, 1.575, 1.6, 1.725, 1.75, 1.775, 1.8, 1.825, 1.85, 1.875, 1.9, 1.925, 1.95, 1.975, 2, 2.125, 2.25, 2.375, or 2.5 wt. % and/or (optionally) up to 5, 4.5, 3.5, 3.4, 3.3, 3.25, 3.2, 3.1, 3, 2.875, 2.75, 2.625, 2.5, 2.375, 2.25, 2.125, or 2 wt. %.

For example, inventive Ni—Cu-BTC MOFs could exhibit gravimetric hydrogen ($H_2$) uptakes in a range of from 1.025, 1.05, 1.075, 1.1, 1.15, 1.2, 1.25, 1.275, 1.3, 1.325, 1.35, 1.375, 1.4, 1.45, 1.5, 1.55, 1.6, 1.65, 1.7, or 1.75 wt. % and/or (optionally) up to 3.5, 3.375, 3.25, 3.125, 3, 2.875, 2.75, 2.625, 2.5, 2.375, 2.25, 2.125, 2, 2.9, 2.8, 2.75, 2.7, or 2.65 wt. %. For example, inventive Fe—Cu-BTC MOFs could exhibit gravimetric hydrogen ($H_2$) uptakes in a range of from 1.25, 1.3, 1.35, 1.4, 1.45, 1.5, 1.55, 1.575, 1.6, 1.625, 1.65, 1.675, 1.7, 1.725, 1.75, 1.775, 1.8, 1.8125, 1.825, 1.8375, 1.85, 1.875, 1.9, 1.95, or 2 wt. % and/or (optionally) up to 4, 4.75, 4.5, 4.25, 4, 3.75, 3.5, 3.25, 3, 2.875, 2.75, 2.625, 2.5, 2.375, 2.25, 2.125, 2, 1.95, 1.9, 1.875, 1.85, 1.825, or 1.8 wt. %. For example, inventive Co—Cu-BTC MOFs could exhibit gravimetric hydrogen ($H_2$) uptakes in a range of from 1.125, 1.15, 1.175, 1.2, 1.225, 1.25, 1.275, 1.3, 1.35, 1.4, 1.45, 1.5, 1.55, 1.6, 1.65, 1.7, 1.75, 1.8, 1.85, 1.9, 1.95, 2, 2.05, 2.1, wt. % and/or (optionally) up to 5, 5.75, 5.5, 5.25, 5, 4.75, 4.5, 4.25, 4, 3.75, 3.5, 3.375, 3.25, 3.125, 3, 2.95, 2.9, 2.85, 2.8, 2.75, 2.7, 2.65, 2.6, 2.55, 2.5, 2.45, 2.4, 2.375, 2.35, 2.325, 2.3, 2.275, 2.25, 2.225, 2.2, 2.175, 2.15, 2.125, 2.1, 2.075, 2.05, 2.025, 2, 1.975, 1.95, 1.925, 1.9, or 1.875 wt. %.

The highest reported uptake for Cu-BTC is about 2.9 wt. % at lower pressure (1 bar) and 3.6 wt % at higher pressures (50 bar), and various pressures such as ranges including, e.g., at least 1, 1.1, 1.25, 1.5, 1.75, 2, 2.5, 3.33, or 5 bar and/or up to 100, 75, 60, 50, 40, 35, 30, 25, 20, 15, 10, 9, 8, 7.5, 7, 6, or 5 bar, may be used. The highest gravimetric uptake of mixed metal Cu-BTC ascertained in the inventive samples were the exemplary Fe—Cu-BTC and Zn—Cu-BTC (at least 33, 40, 45, 50, 52.5, 55, 57.5, 60, or 62.5% over Cu-BTC) least material, followed by Ni—Cu-BTC (at least 33, 40, 45, 50, 52.5, 55, 57.5, or 60% over Cu-BTC), then Co—Cu-BTC (at least 3.33, 4, 5, 6.7, 7.5, 8, 9, 10, 11, 12, or 12.5% over Cu-BTC), around 110 kPa, i.e., slightly above standard pressure (101.325 kPa). Without wishing to be bound to any scientific theory, the improvement in the gravimetric $H_2$ uptake in M-Cu-BTC is believed to be mainly due to the increased binding enthalpy of $H_2$ with the unsaturated metal sites after the partially exchanging the Cu(II) with M(II). The binding enthalpy may increase due to the higher charge density of M(II). These sites can polarize $H_2$, which provides primary binding sites for $H_2$ inside the pores of the M-Cu-BTC framework, subsequently enhancing the gravimetric uptake of the material(s).

Numerous modifications and variations of the present invention are possible in light of the above teachings. It is therefore to be understood that within the scope of the appended claims, the invention may be practiced otherwise than as specifically described herein.

The invention claimed is:

1. An MM-MOF, comprising:
   a linker comprising 1,3,5-benzenetricarboxylate;
   copper (II) cations; and
   nickel (II) cations,
   wherein the Ni(II) cations are contained in a range of from 15 to 25 atom, % and a remainder of the Cu(II) cations;
   wherein the MM-MOF is crystalline by PXRD and has TBO topology and is in the form of polyhedral crystals with average longest dimension 1 to 5 µm;
   wherein the MM-MOF has a gradient in $Cu^{2+}$ concentration between a center of the MM-MOF and an outer perimeter of the MM-MOF,
   wherein a concentration of the $Cu^{2+}$ is higher towards the center of the MM-MOF than the outer perimeter.

2. The MM-MOF of claim 1, comprising no more than 2.5 wt. % amorphous phases.

3. The MM-MOF of claim 1, having a gradient in Cu(II) cations concentration between a center of the MM-MOF and an outer perimeter of the MM-MOF,
   wherein concentration of the Cu(II) cations is higher towards the center of the MM-MOF than the outer perimeter.

4. The MM-MOF of claim 1, wherein the linker and the divalent metal cations are ionically bound into the MM-MOF.

5. The MM-MOF of claim 1, having a BET surface area of 600 to 1100 $m^2/g$, a pore volume of 0.200 to 0.400 $cm^3/g$, and/or a mean pore diameter of 1.50 to 1.80 nm.

6. The MM-MOF of claim 1, having a hydrogen gravimetric capacity of 1.02 to 6.5 wt. %.

* * * * *